US010315256B1

(12) United States Patent
Stephenson, Jr.

(10) Patent No.: US 10,315,256 B1
(45) Date of Patent: Jun. 11, 2019

(54) MAGNETIZED DRILL ACCESSORY FOR RETENTION OF OBJECTS

(71) Applicant: Samuel S. Stephenson, Jr., Boca Raton, FL (US)

(72) Inventor: Samuel S. Stephenson, Jr., Boca Raton, FL (US)

( * ) Notice: Subject to any disclaimer, the term of this patent is extended or adjusted under 35 U.S.C. 154(b) by 735 days.

(21) Appl. No.: 14/727,783

(22) Filed: Jun. 1, 2015

Related U.S. Application Data

(63) Continuation-in-part of application No. 13/967,325, filed on Aug. 14, 2013, now Pat. No. 9,573,197.

(60) Provisional application No. 61/743,662, filed on Sep. 10, 2012, provisional application No. 62/006,837, filed on Jun. 2, 2014.

(51) Int. Cl.
| | |
|---|---|
| *A43B 9/02* | (2006.01) |
| *A43B 5/08* | (2006.01) |
| *A43B 7/08* | (2006.01) |
| *B65D 69/00* | (2006.01) |
| *B23B 45/00* | (2006.01) |

(52) U.S. Cl.
CPC ............ *B23B 45/003* (2013.01); *B65D 69/00* (2013.01)

(58) Field of Classification Search
CPC ........ B25B 45/003; B65D 69/00; A45C 11/26
USPC .......................... 224/183; 206/372, 119, 350
See application file for complete search history.

(56) References Cited

U.S. PATENT DOCUMENTS

| | | | | |
|---|---|---|---|---|
| 4,508,221 A | * | 4/1985 | Olson ..................... | B25F 5/029 206/371 |
| 5,195,538 A | * | 3/1993 | Eldridge, Jr. .......... | A61B 46/23 128/849 |
| 2011/0163137 A1 | * | 7/2011 | Podda-Heubach .... | A61B 90/53 224/183 |

* cited by examiner

*Primary Examiner* — Robert F Long
*Assistant Examiner* — Xavier A Madison
(74) *Attorney, Agent, or Firm* — Allen D Hertz, P.A.; Allen D. Hertz

(57) ABSTRACT

A magnetized item retention assembly comprising at least one magnetized element at least partially embedded with a formed non-magnetic body adapted for integration or attachment to a power tool or portable power pack for the power tool. The magnetized element(s) are placed and retained within cavities formed within an interior of the body. The body can be fabricated as a unitary molded component or an assembly comprising a plurality of molded components. The multiple part design would include an assembly step for joining the separate components. The magnetized element(s) are used to temporarily retain magnetic objects, such as screws, drill bits, driver bits, etc. The body can have a planar shape, an inverted "U" shape, or any other suitable shape. The assembly can be attached to the drill using any suitable adhesive. The legs of the inverted "U" shape protect the objects, while supporting the tool when not in use.

20 Claims, 18 Drawing Sheets

MAGNETIZED DRILL ACCESSORY FOR RETENTION OF OBJECTS

CROSS-REFERENCE TO RELATED APPLICATION

This application is a Continuation-In-Part claiming the benefit of U.S. patent application Ser. No. 13/967,325, filed on Aug. 14, 2013, which is a Non-Provisional patent application claiming the benefit of U.S. Provisional Patent Application Ser. No. 61/743,662, filed on Sep. 10, 2012, and this application additionally claims the benefit of U.S. Provisional Patent Application Ser. No. 62/006,837, filed on Jun. 2, 2014.

FIELD OF THE INVENTION

The present invention relates to a drill accessory, and more particularly, a magnetized retention member that is adhesively attached to a portably power drill for temporarily retaining magnetic objects, such as drill bits, driver bits, screws, bolts, nuts, rivets, and the like.

BACKGROUND OF THE INVENTION

Drills are used for any of a variety of applications, including forming or enlarging holes through objects, forming countersinks, installing or securing threaded fasteners, or any other process utilizing a rotational motion. Because of the flexibility of the drill, there are many scenarios where the drill is used for multiple functions during the same time frame. It is common to need different objects to complete the task at hand. One example would be a process of drilling pilot holes and installing a series of screws, where the individual would need a drill bit, a driver bit, and the series of screws. The problem is retaining the drill bit, the driver bit, and the series of screws throughout the various steps required for completing the task. One known method would be to retain the objects in a pocket. This takes additional time to retrieve the objects from within the pocket. Sharp objects, such as screws, can be uncomfortable, or even cause injury to the individual, thus creating an undesirable scenario.

Another, even less desirable scenario, is to temporarily hold the objects in one's mouth. This solution introduces additional potential health risks including illness from ingesting bacteria or other contaminants residing on the surface of the objects or injury from swallowing the objects.

Some portable drills include a retention element having specifically shaped receptacles for temporarily retaining tools, such as screw driver bits, a driver bit extension, and the like. This solution is limited in that the retention element is designed to hold a specific object having a specific shape and size. This solution fails to provide accommodations for retaining a broader selection of tools including drill bits, nut drivers, and the like; fasteners, such as screws, bolts, nuts, washers, and the like; and other objects that might be used during completion of a task.

Accordingly, there remains a need in the art for a device that can temporarily retain objects while completing a task that employs a power tool, such as a portable power drill.

SUMMARY OF THE INVENTION

The present invention overcomes the deficiencies of the known art and the problems that remain unsolved by providing a method and respective apparatus for temporarily retain objects while completing a task that employs a power tool, such as a portable power drill.

In accordance with one embodiment of the present invention, the invention includes an accessory attached to a portable power drill, the combination comprising:
a magnetized object retention panel comprising:
a substrate having an exposed surface and an opposite, attachment surface, the exposed surface and attachment surface being bound by a peripheral edge, and
a magnetized material carried by the exposed surface;
a portable power drill comprising:
a drill housing,
a chuck rotationally integrated with the portable power drill,
a battery pack removably engaging with the portable power drill, and
a trigger integrated into the drill, wherein the trigger controls operation of the drill resulting in powered rotation of the chuck,
wherein the magnetized object retention panel is affixed to one of:
an exterior surface of a segment of the drill housing, and
an exterior surface of the battery pack.

In a second aspect, the magnetized object retention panel is affixed to a base segment of the drill housing.

In another aspect, the magnetized object retention panel is affixed to a base surface of the battery pack.

In yet another aspect, the magnetized object retention panel is affixed to a sidewall surface of the battery pack.

In yet another aspect, the magnetized object retention panel is formed and affixed to a front surface and at least one adjacent sidewall surface of the battery pack.

In yet another aspect, the magnetized object retention panel is affixed to one of the drill housing and the battery pack using an adhesive.

In yet another aspect, the magnetized object retention panel further comprises an adhesive carried by the attachment surface.

In yet another aspect, the magnetized object retention panel is affixed to one of the drill housing and the battery pack using adhesive dense hook and loop tape.

In yet another aspect, the magnetized object retention panel further comprises a plurality of spatially arranged grooves extending inward from the exterior surface of the magnetized exposed surface, wherein the grooves are sized and shaped to facility formation of an arch in the magnetized object retention panel.

In yet another aspect, the magnetized object retention panel further comprises a plurality of spatially arranged grooves extending inward from the exterior surface of the magnetized exposed surface, wherein the grooves are parallel to one another.

In yet another aspect, the magnetized object retention panel further comprises a plurality of spatially arranged grooves extending inward from the exterior surface of the magnetized exposed surface, wherein the grooves are parallel to one another and extend between longitudinal edges thereof.

In yet another aspect, the magnetized object retention panel further comprises a plurality of spatially arranged grooves extending inward from the exterior surface of the magnetized exposed surface, wherein the grooves are parallel to one another and extend perpendicularly between a pair of parallel longitudinal edges thereof.

In yet another aspect, each of the plurality of spatially arranged grooves is formed having a "V" shaped channel.

In yet another aspect, each of the plurality of spatially arranged grooves is formed having a rounded or "U" shaped channel.

In a second embodiment, the magnetized object retention member is provided as a magnetized item retention channel, the magnetized item retention channel comprising:

a channel basewall having an exposed surface and an opposite, attachment surface, and a magnetized material assembled by at least one of: carried by the exposed surface and located internally to the magnetized item retention channel, at least one channel sidewall extending generally perpendicular from a respective longitudinal edge, the at least one channel sidewall terminating at a channel base surface, wherein a height of the at least one channel sidewall extending between the channel basewall exposed surface and the channel base surface is greater than a transverse dimension of an anticipated retained object.

In another aspect, the height of the at least one channel sidewall is at least ¼".

In another aspect, the height of the at least one channel sidewall is at least ½".

In another aspect, the height of the at least one channel sidewall is between ¼" and ½".

In another aspect, the height of the at least one channel sidewall is less than 1".

In another aspect, the magnetized item retention channel further comprises a magnetized material carried by an inner surface of the at least one channel sidewall.

In yet another aspect, the magnetized item retention channel further comprises an adhesive carried by the attachment surface.

In yet another aspect, the magnetized item retention channel further comprises a pair of channel sidewalls, each channel sidewall extending generally perpendicular from a respective longitudinal edge, each of the pair of channel sidewalls terminating at a channel base surface.

In yet another aspect, heights of each of the pair of channel sidewalls are equal to one another, resulting in the respective channel base surfaces forming a plane.

In yet another aspect, the magnetized item retention channel is affixed to a base segment of the drill housing.

In yet another aspect, the magnetized item retention channel is affixed to a base surface of the battery pack.

In yet another aspect, the magnetized item retention channel is affixed to a base surface of one of the drill housing and the battery pack using an adhesive.

In yet another aspect, the magnetized item retention channel is affixed to a base surface of one of the drill housing and the battery pack using an adhesive strip.

In yet another aspect, the magnetized item retention channel is affixed to a base surface of one of the drill housing and the battery pack using an adhesive strip located within a recess formed in a respective top surface of the magnetized item retention channel.

In yet another aspect, the magnetized item retention channel is affixed to a base surface of one of the drill housing and the battery pack using a magnetic attraction between a first magnetic element of one of the drill housing and the battery pack and a magnetic element integral with the magnetized item retention channel.

In yet another aspect, the magnetized item retention channel is affixed to a base surface of one of the drill housing and the battery pack using a magnetic attraction between a first magnetic element coupled to one of the drill housing and the battery pack and the magnetic element integral with the magnetized item retention channel.

In yet another aspect, the magnetized item retention channel is affixed to a base surface of one of the drill housing and the battery pack using a magnetic attraction between a first magnetic element adhesively bonded to one of the drill housing and the battery pack and the magnetic element integral with the magnetized item retention channel.

In yet another aspect, the magnetized item retention channel is manufactured of a flexible material, including nylon, silicone, plastic, and the like.

In yet another aspect, the magnetized item retention channel is manufactured of an elastic material, including rubber, and the like.

In yet another aspect, the magnetized item retention channel is manufactured of a metallic material, including steel, aluminum, and the like.

In yet another aspect, the magnetized item retention channel is manufactured of a metallic material, including steel, aluminum, and the like.

In yet another aspect, the magnetized material is applied upon the exposed surface.

In yet another aspect, the magnetized material is a secondary material applied to the exposed surface of the magnetized item retention channel.

In yet another aspect, the magnetized material is a sheet of material adhered to the exposed surface of the magnetized item retention channel.

In yet another aspect, the magnetized material is integrated into material used to form the magnetized item retention channel.

In a third embodiment, the magnetized object retention member is provided as a formed assembly embedding at least one magnetized element within a formed casing, the magnetized object retention member comprising:

a formed non-magnetic casing, and a magnetized element at least partially enclosed within the formed non-magnetic casing.

In yet another aspect, an attachment element is carried by the formed non-magnetic casing, wherein the attachment element provides a mechanical coupling between the formed non-magnetic casing and a portion of the drill or drill battery pack.

In yet another aspect, the formed non-magnetic casing is formed by over-molding the casing about at least one magnetized component.

In yet another aspect, the formed non-magnetic casing is formed having at least two components that are joined together forming a cavity, wherein the magnetized element is carried within the cavity.

In yet another aspect, the formed non-magnetic casing is formed having a plurality of members that are joined together using any suitable mating mechanical features, including:

pins and mating pin receptacles, clips, mechanical fasteners, mechanical snaps, threaded fasteners, a channel and respective mating edge, and the like.

In yet another aspect, the formed non-magnetic casing is formed having a plurality of members that are joined together using any suitable bonding element, including:

adhesive, one part epoxy, multi-part epoxy, ultrasonic welding, adhesive tape, and the like.

In yet another aspect, the formed non-magnetic casing is formed having at least two components that are joined together forming a plurality of cavities, wherein a plurality of magnetized elements are carried within each of the plurality of cavities. In one exemplary embodiment, the formed non-magnetic casing comprises four cavities arranged in a two by two grid. In a second exemplary embodiment, the formed non-magnetic casing comprises two elongated cavities arranged in a one by two grid. In a third exemplary embodiment, the formed non-magnetic casing comprises six cavities arranged in a two by three grid.

In yet another aspect, the formed non-magnetic casing is formed having a base member and a top member that are joined together forming at least one cavity.

In yet another aspect, the formed non-magnetic casing is formed having a base member comprising a plurality of pin receptacles and a top member comprising a plurality of pins, wherein the top and base members are joined together forming by inserting each pin into a mating pin receptacle.

In a fourth embodiment, the magnetized object retention member is provided as a magnetized item retention channel, the magnetized item retention channel comprising:
  an enclosure comprising:
    a channel base section having an exposed surface and an opposite, attachment surface, and
    at least one channel sidewall extending generally perpendicular from a respective longitudinal edge, the at least one channel sidewall originating from the channel base section exposed surface; and
  at least one magnetized element at least partially enclosed within the formed non-magnetic casing,
  wherein a height of the at least one channel sidewall extending between the channel base wall exposed surface and the channel base surface is greater than a transverse dimension of an anticipated retained object.

In yet another aspect, at least a portion of the at least one magnetized element is placed into a cavity formed within the channel base section.

In yet another aspect, at least a portion of the at least one magnetized element is placed into a cavity formed within the channel sidewall section.

In yet another aspect, the magnetized object retention member further comprises a plurality of magnetized elements, wherein a portion of the plurality of magnetized elements placed into a cavity formed within the channel base section and a balance of the plurality of magnetized elements is placed into a cavity formed within the channel sidewall section.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
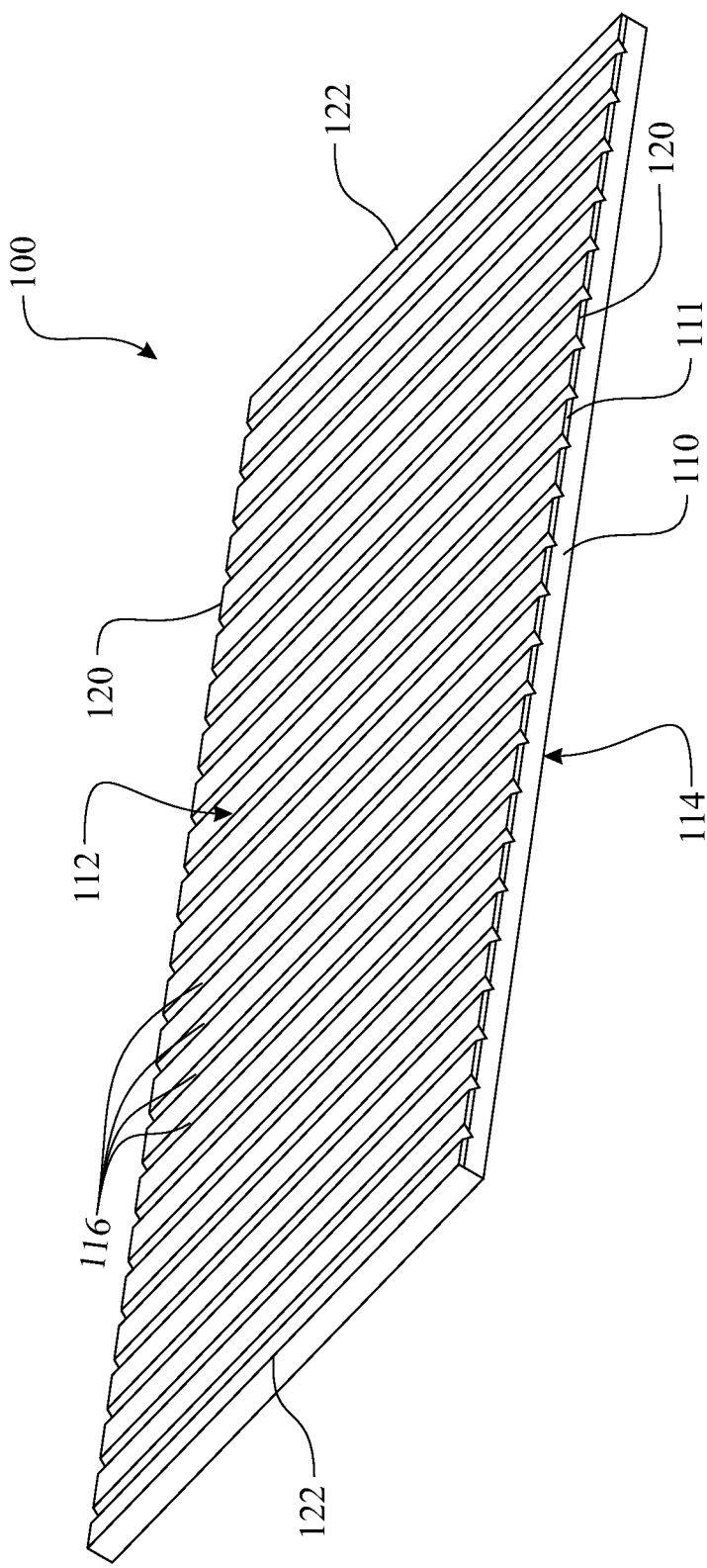
FIG. 1 presents an isometric view detailing a magnetized surface side of an exemplary magnetized object retention panel.
Figure 2:
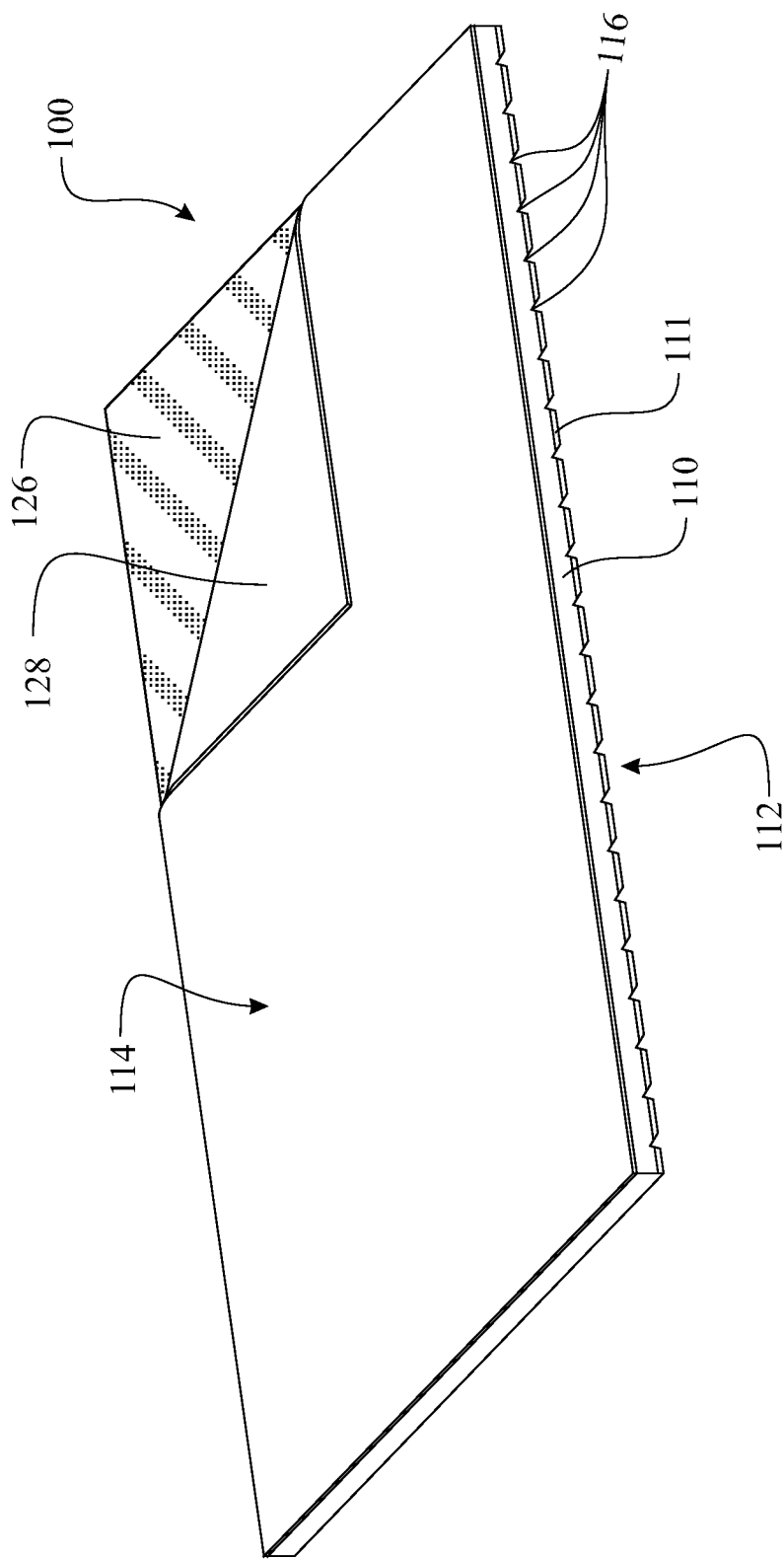
FIG. 2 presents an isometric view detailing an attachment surface side of the magnetized object retention panel originally introduced in FIG. 1.
Figure 3:
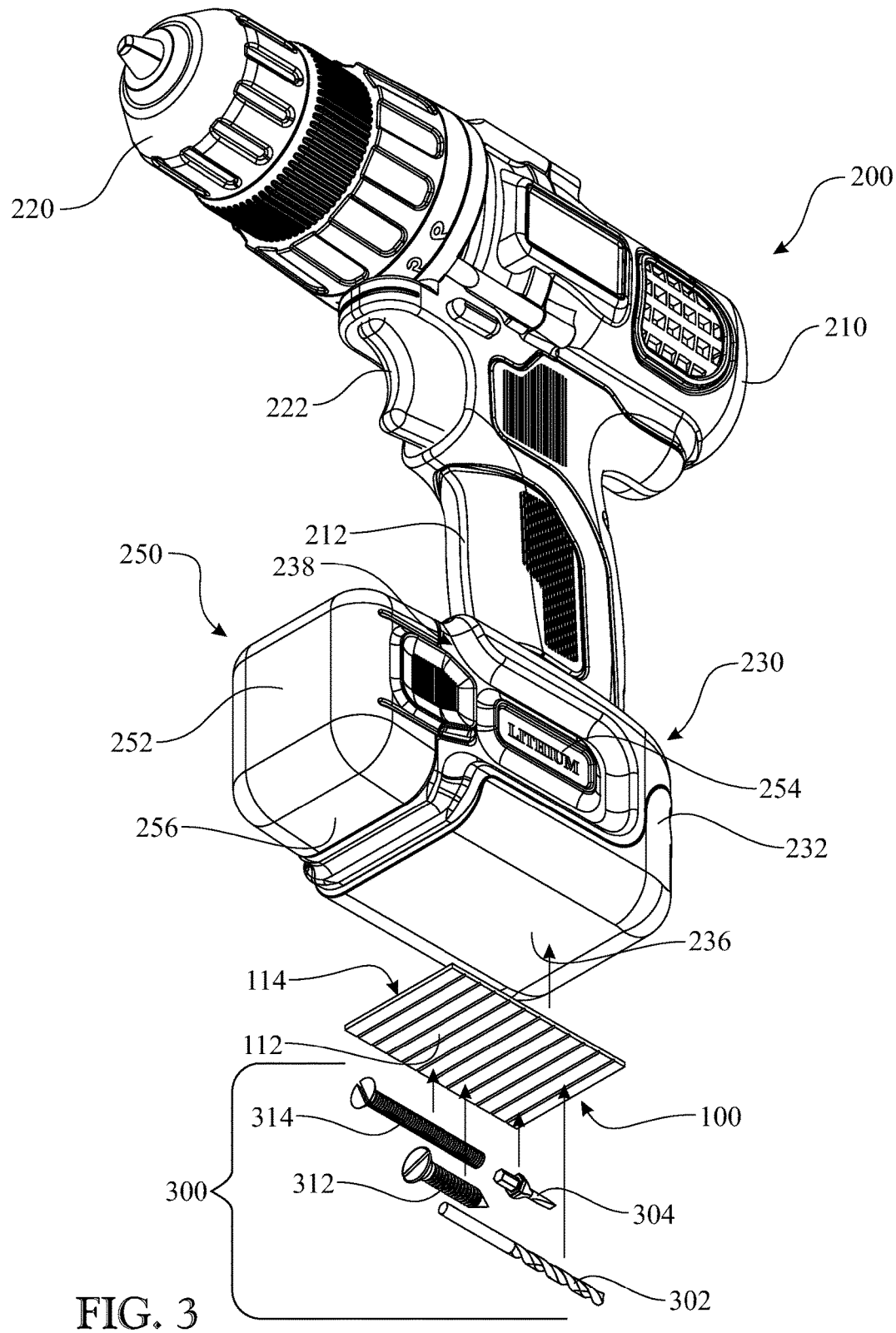
FIG. 3 presents an isometric exploded assembly view illustrating a first embodiment for attaching the magnetized object retention panel originally introduced in FIG. 1 onto a base portion of a portable powered drill.
Figure 4:
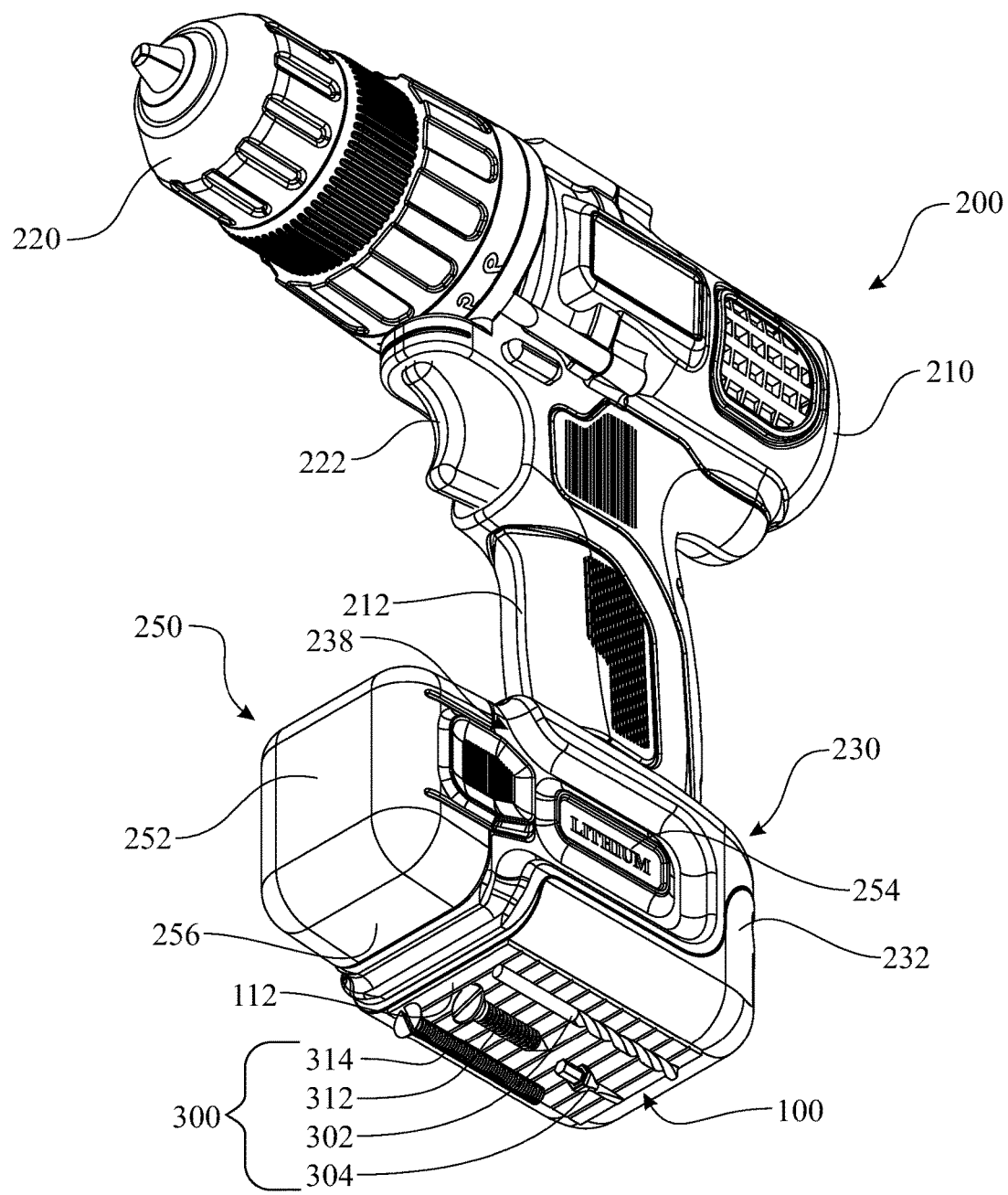
FIG. 4 presents an isometric view illustrating a variety of objects being temporarily retained by the magnetized object retention panel affixed to the base portion of the portable powered drill.
Figure 5:
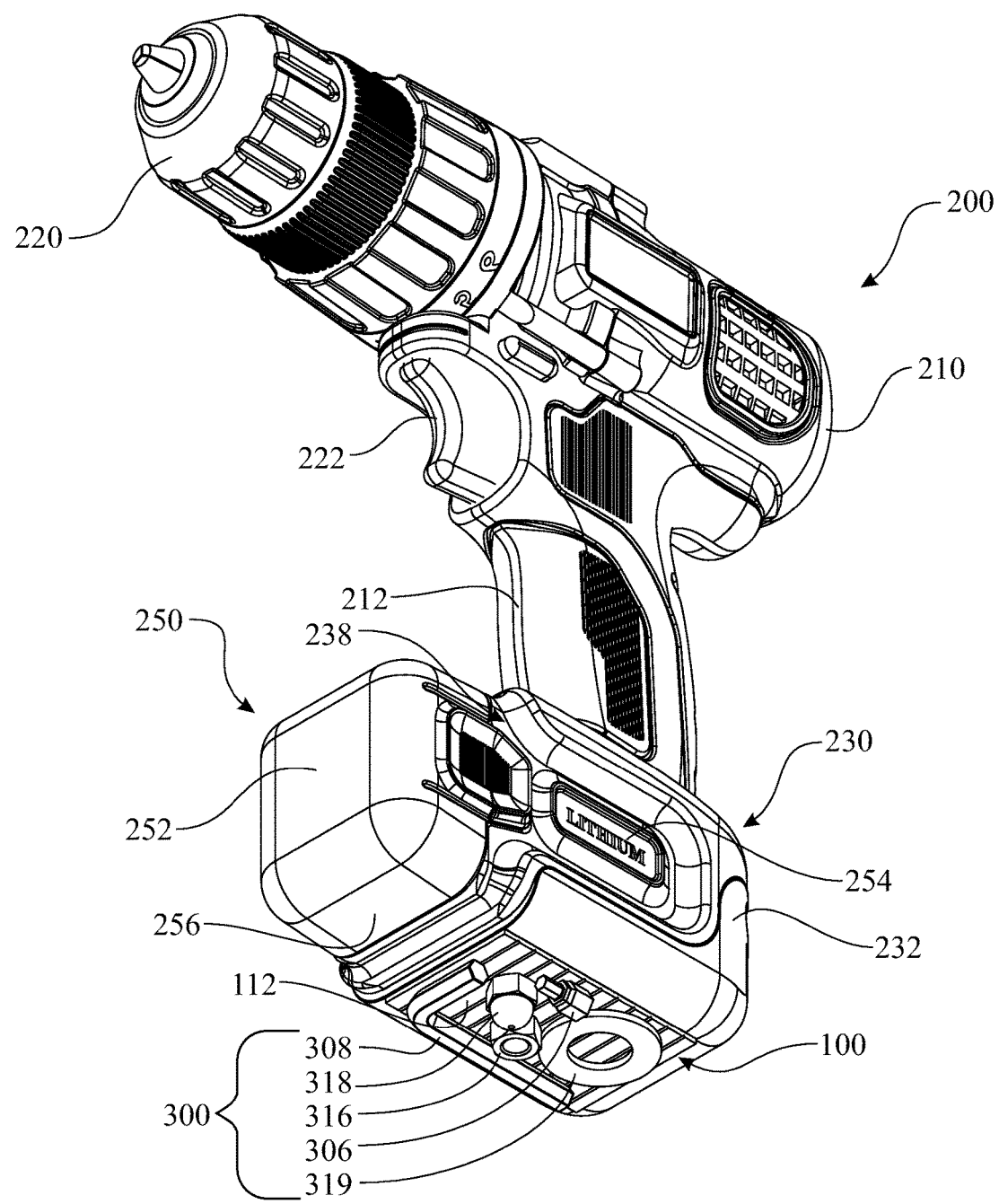
FIG. 5 presents an isometric view illustrating a second variety of objects being temporarily retained by the magnetized object retention panel affixed to the base portion of the portable powered drill.

A magnetized object retention panel 100 is introduced in FIGS. 1 and 2 for attachment to a portable power drill 200 as illustrated in FIGS. 3 through 7. The exemplary magnetized object retention panel 100 is fabricated of a magnetized substrate 110 having a magnetic material 111 carried upon a magnetized exposed surface 112 and an adhesive 126 carried upon an adhesive attachment surface 114. The magnetized substrate 110 is manufactured using a flexible material, such as flexible plastic, rubber, paper, vinyl, polypropylene laminates, and any other suitable flexible material. It is understood that the magnetized substrate 110 can be manufactured using a semi-rigid or rigid material, such as plastic, metal, and the like for more limited applications. The magnetic material 111 is laminated onto the magnetized exposed surface 112. Alternatively, the magnetized substrate 110 can be manufactured using a flexible resin or binder such as vinyl, integrating the magnetic material 111 into the magnetized substrate 110 as a unitary sheet. An adhesive 126 can be applied to the adhesive attachment surface 114 of the magnetized substrate 110 for affixing the magnetized object retention panel 100 to the portable power drill 200. The adhesive 126 is protected by a backing member 128 until application onto the portable power drill 200. Alternatively, the adhesive attachment surface 114 can be left having a natural finish, passing options for a method of attachment to the installer. A series of grooves 116 can be formed into the magnetized exposed surface 112 using any suitable known process. The series of grooves 116 can be formed using any of: a machining process, a cutting process, a compression process, or the like. Each of the series of grooves 116 can have any reasonable shape, including a "V" shaped scoring, a "U" shaped scoring, a square or rectangular shaped scoring, and the like. The series of grooves 116 are preferably arranged having an equally spaced parallel relationship. It is understood that the series of grooves 116 can be arranged having any spatial relationship, wherein each of the series of grooves 116 can span between opposing longitudinal edges 120 of the magnetized substrate 110. The series of grooves 116 are preferably arranged being perpendicular to each of opposing parallel longitudinal edges 120.

In one variant, a second series of grooves (not shown) can be formed extending into the magnetized substrate 110 from the magnetized exposed surface 112, wherein the second series of grooves have an angled relation respective to the grooves 116. In one variant, the second series of grooves can be perpendicular to the first series of grooves 116, extending between lateral edges 122. The second series of grooves would be arranged in a manner similar to the arrangement of the first series of grooves 116.

Details of the portable power drill 200 are disclosed, wherein the elements of the portable power drill 200 will be helpful when describing the method of affixing the magnetized object retention panel 100 to the portable power drill 200. Details of the portable power drill 200 and several exemplary configurations for adhering the magnetized object retention panel 100 to the portable power drill 200 are presented in FIGS. 3 through 7. The portable power drill 200 includes a drill housing 210, wherein the drill housing 210 includes features to support components utilized to complete the portable power drill 200. A drill handgrip 212 can be integrated into the drill housing 210 forming a unitary structure. The drill housing 210 is commonly designed having two (2) sections: a left-half shell and a right-half shell. Operational components, including an electric motor, a transmission, a chuck driveshaft, any associated electrical components, and an optional clutch are assembled directly or indirection to the drill housing 210. A chuck 220 is rotationally adapted to the chuck driveshaft. A battery receiving section 230 can be combined into a lower end of the drill handgrip 212 as a unitary structure or manufactured as a separate unit and subsequently assembled to a lower end of the drill handgrip 212. It is understood that the battery receiving section 230 can be designed having any suitable shape. The exemplary battery receiving section 230 includes a battery receptacle 232 having a "C" shaped design forming a battery receiving cavity 238 for receiving a battery pack 250 in a horizontal direction (perpendicular to a longitudinal direction of the drill handgrip 212). The battery receptacle 232 provides a drill housing base surface 236. In an alternative embodiment, the battery receiving section 230 is formed at a lower, base or distal region of the drill handgrip 212, wherein the battery receiving section 230 receives the battery pack 250 in a vertical or upward direction (parallel to the longitudinal direction of the drill handgrip 212). Electrical contacts are integrated into the battery receiving section 230 for engaging with mating electrical contacts provided on the battery pack 250. A trigger 222 is assembled to the drill housing 210, providing a user with a means for controlling operation of the portable power drill 200. The trigger 222 is integrated into an electrical circuit in conjunction with the electrical contacts, the motor, and electrical conductors or wires. It is noted, common components assembled within an interior of the drill housing 210 of the portable power drill 200 (such as the motor, transmission, electrical contacts, wiring, and the like) are not illustrated, as they are well known by those skilled in the art.

The magnetized object retention panel 100 can be affixed to the portable power drill 200 at any suitable location. Several exemplary installations are presented in FIGS. 3 through 7, with others being described herein. In a first exemplary installation, the adhesive attachment surface 114 of the magnetized object retention panel 100 is affixed to an exposed lower surface of the portable power drill 200, wherein the specific feature would be defined by the configuration of the battery receiving section 230. In the illustrated configuration (FIGS. 3 through 5), the exposed lower surface of the portable power drill 200 is a drill housing base surface 236. In an alternative configuration, where the battery pack bottom surface 256 is the exposed lower surface, the adhesive attachment surface 114 of the magnetized object retention panel 100 would be affixed to the battery pack bottom surface 256.

Any magnetically attractable object 300 can be retained by the magnetic material 111 of the magnetized object retention panel 100. The magnetically attractable objects 300 can include, but are not limited to, drill bits 302, screw driver bits 304, hex driver bits 306, hex key or Allen wrenches 308, screws 312, bolts 314, hex nuts 316, acorn nuts 318, washer 319, and the like. The magnetized material would be selected having a magnetic strength suitable for retaining the magnetically attractable objects 300 thereon during common use of the portable power drill 200.

The magnetized object retention panel 100 can be affixed to the respective portion of the portable power drill 200 using any suitable attachment process, including mechanical devices, adhesive and the like. In the exemplary embodiment, an adhesive 126 is applied to the adhesive attachment surface 114. The adhesive 126 is protected by a backing member 128 applied thereon and only removed as a precursor to an adhesion step. In an alternative embodiment, the magnetized object retention panel 100 can be affixed to the respective portion of the portable power drill 200 by applying any suitable adhesive to the adhesive attachment surface 114 and/or the respective portion of the portable power drill 200. The magnetized object retention panel 100 would then be positioned contacting the respective portion of the portable power drill 200 and retained in position until the adhesive sets/cures. The adhesive can be a one-part composition, a two-part composition, or a multi-part composition. In another alternative embodiment, the magnetized object retention panel 100 can be affixed to the respective portion of the portable power drill 200 by sandwiching a sheet of double-sided tape between the adhesive attachment surface 114 and the respective portion of the portable power drill 200. In yet another embodiment, the magnetized object retention panel 100 can be affixed to the respective portion of the portable power drill 200 by mechanically fastening the adhesive attachment surface 114 to the respective portion of the portable power drill 200. The mechanical fasteners can be screws, rivets, clips, wire, and the like.

The magnetized object retention panel 100 can be manufactured of a material that can be sheered using scissors or other manual, generally available cutting device. The material is selected enabling the magnetized object retention panel 100 to be sized by the installer to fit the selected installation location on the portable power drill 200. The corners of the magnetized object retention panel 100 can be rounded (as shown in FIGS. 6 and 7) to improve reliability, longevity of adhesion to the portable power drill 200, reduction of potential injury to the user, and the like.

Figure 6:
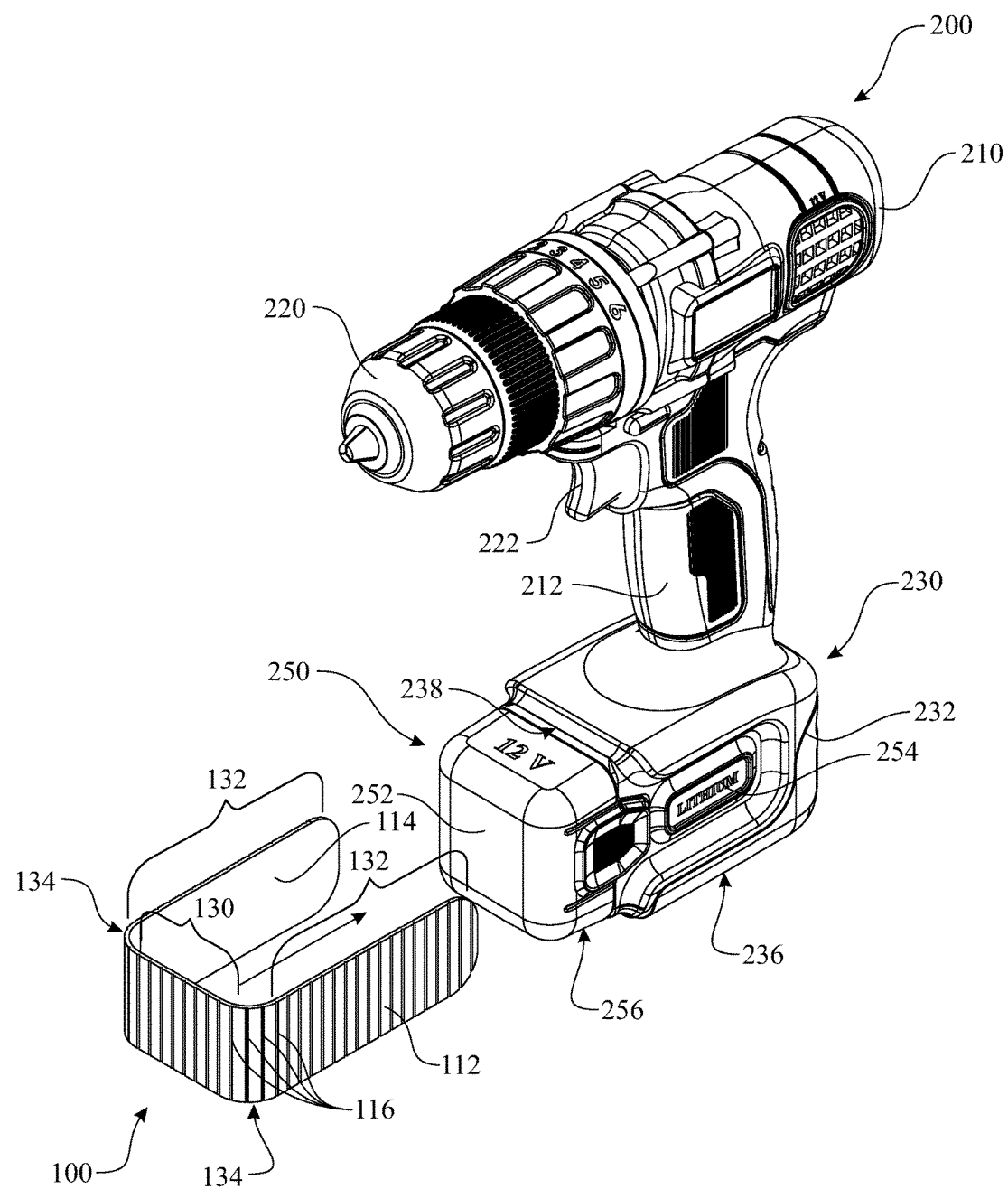
FIG. 6 presents an isometric exploded assembly view illustrating a second embodiment for forming and attaching the magnetized object retention panel onto a plurality of sidewalls of an exemplary battery pack employed to provided power to the portable powered drill.
Figure 7:
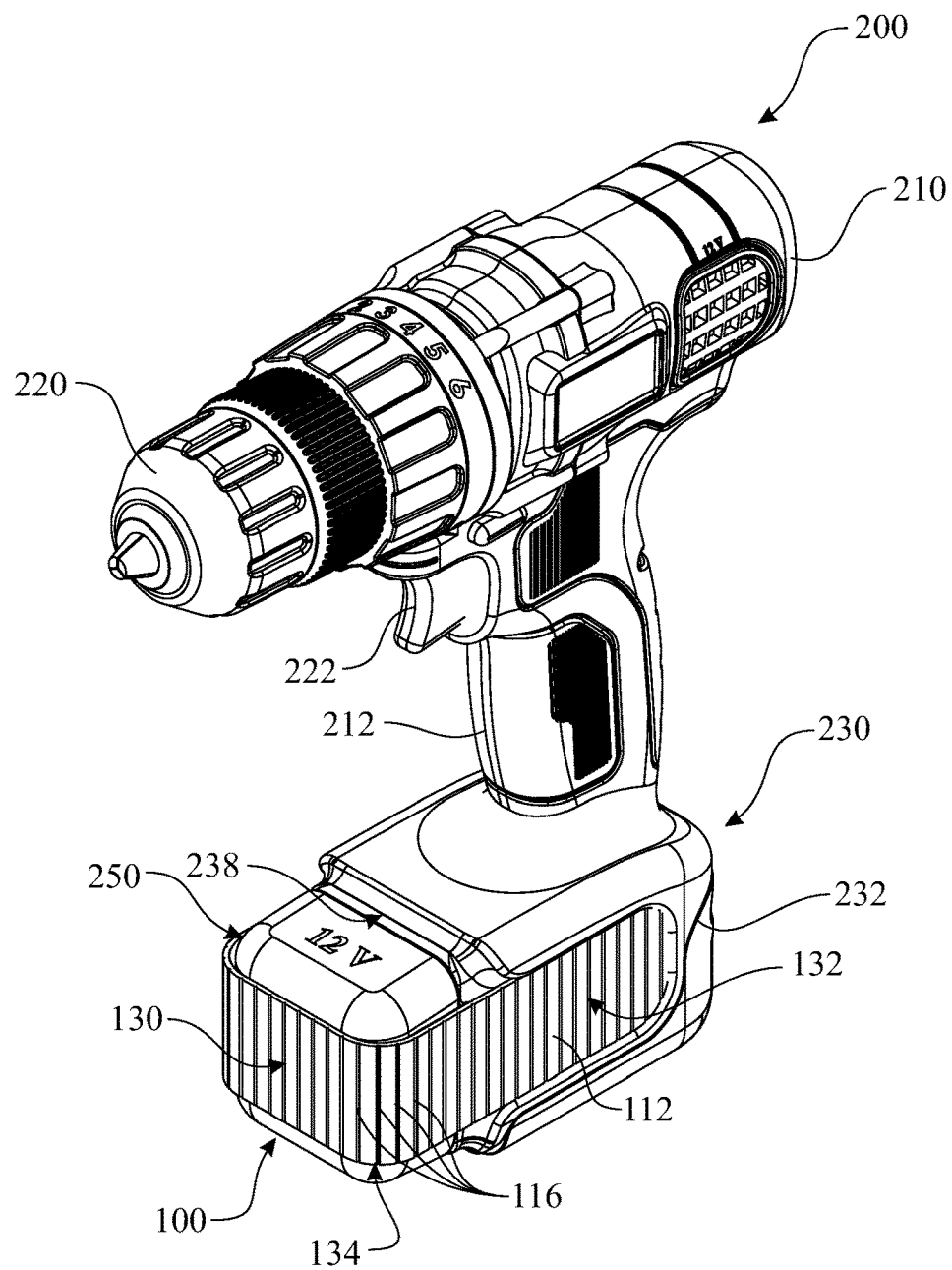
FIG. 7 presents an isometric view illustrating the second attachment embodiment wherein the magnetized object retention panel is affixed to the plurality of sidewalls of the exemplary battery pack employed to provided power to the portable powered drill.

In a second exemplary installation, the magnetized object retention panel 100 is formed to contour to a selected exterior surface of the portable power drill 200; in this case, an exterior surface of the battery pack 250, as illustrated in FIGS. 6 and 7. The target surface for applying the magnetized object retention panel 100 can be one or more linearly contiguous surfaces. The series of grooves 116 formed within the magnetized substrate 110 enables a formation of one or more bends or arches therein. In the exemplary embodiment, the magnetized object retention panel 100 is affixed to a battery pack front surface 252 and a pair of adjacent battery pack side surfaces 254. The magnetized substrate 110 can be shaped prior to or during the attachment process. The magnetized substrate 110 is bent forming a pair of arched segments 134, segmenting the magnetized substrate 110 into a front attaching segment 130 and a pair of side attaching segments 132. The arched segment 134 would be located and shaped to correspond to like corners on the respective receiving surface, in this case, the respective corners of the battery pack 250. The magnetized object retention panel 100 can be affixed to the portable power drill 200 in any suitable manner. In one process, the magnetized object retention panel 100 is aligned by placing the arched segment 134 against a respective corner of the battery pack 250, the side attaching segment 132 is affixed to the respective battery pack side surface 254, the front attaching segment 130 is affixed to the battery pack front surface 252, and the remaining side attaching segment 132 is affixed to the other respective battery pack side surface 254. In a second process, a center of the magnetized object retention panel 100 is aligned with a center of the battery pack front surface 252 and affixed in position. The magnetized substrate 110 is bent, forming an arched segment 134 around the respective corner of the battery pack 250, segmenting the magnetized substrate 110 into the front attaching segment 130 and the side attaching segment 132. The first side attaching segment 132 is wrapped about the battery pack 250 and affixed to the respective battery pack side surface 254. The second side attaching segment 132 is wrapped about another side of the battery pack 250 and affixed to the other respective battery pack side surface 254. It is also understood that the magnetized object retention panel 100 can be cut to an applicable size and affixed to the associated portion of the portable power drill 200 as desired. Although the exemplary embodiment illustrates attaching the magnetized object retention panel 100 to the battery pack 250, it is understood that the magnetized object retention panel 100 can be adhered to any suitable surface or surfaces of the drill housing 210, and more specifically, portions of the battery receiving section 230.

Figure 8:
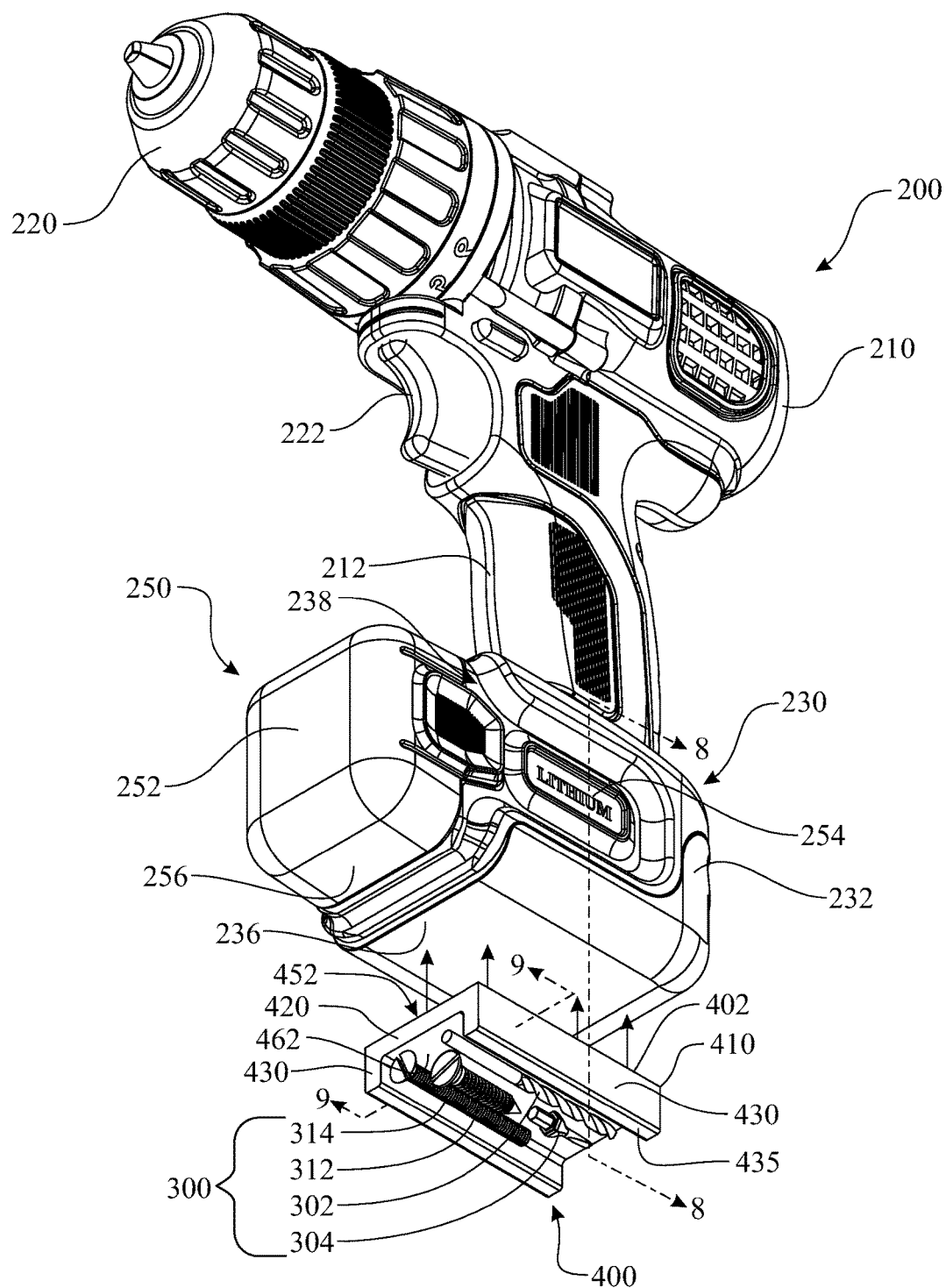
FIG. 8 presents an isometric exploded assembly view of an exemplary embodiment of a magnetized item retention channel carrying the variety of objects being affixed to the base portion of a portable powered drill.
Figure 9:
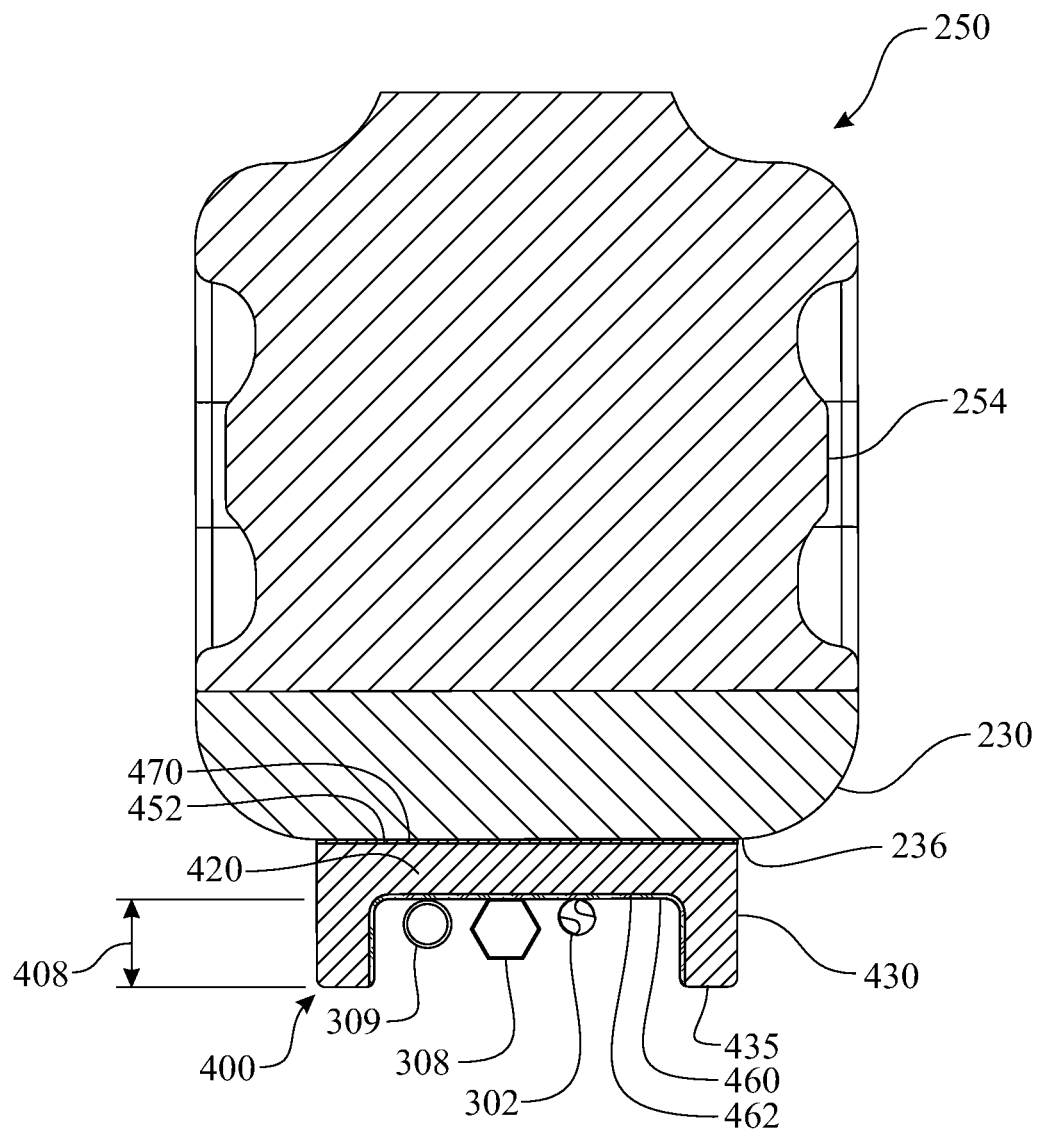
FIG. 9 presents cross section view of the magnetized item retention channel introduced in FIG. 8, the section taken along section line 9-9 of FIG. 8.
Figure 10:
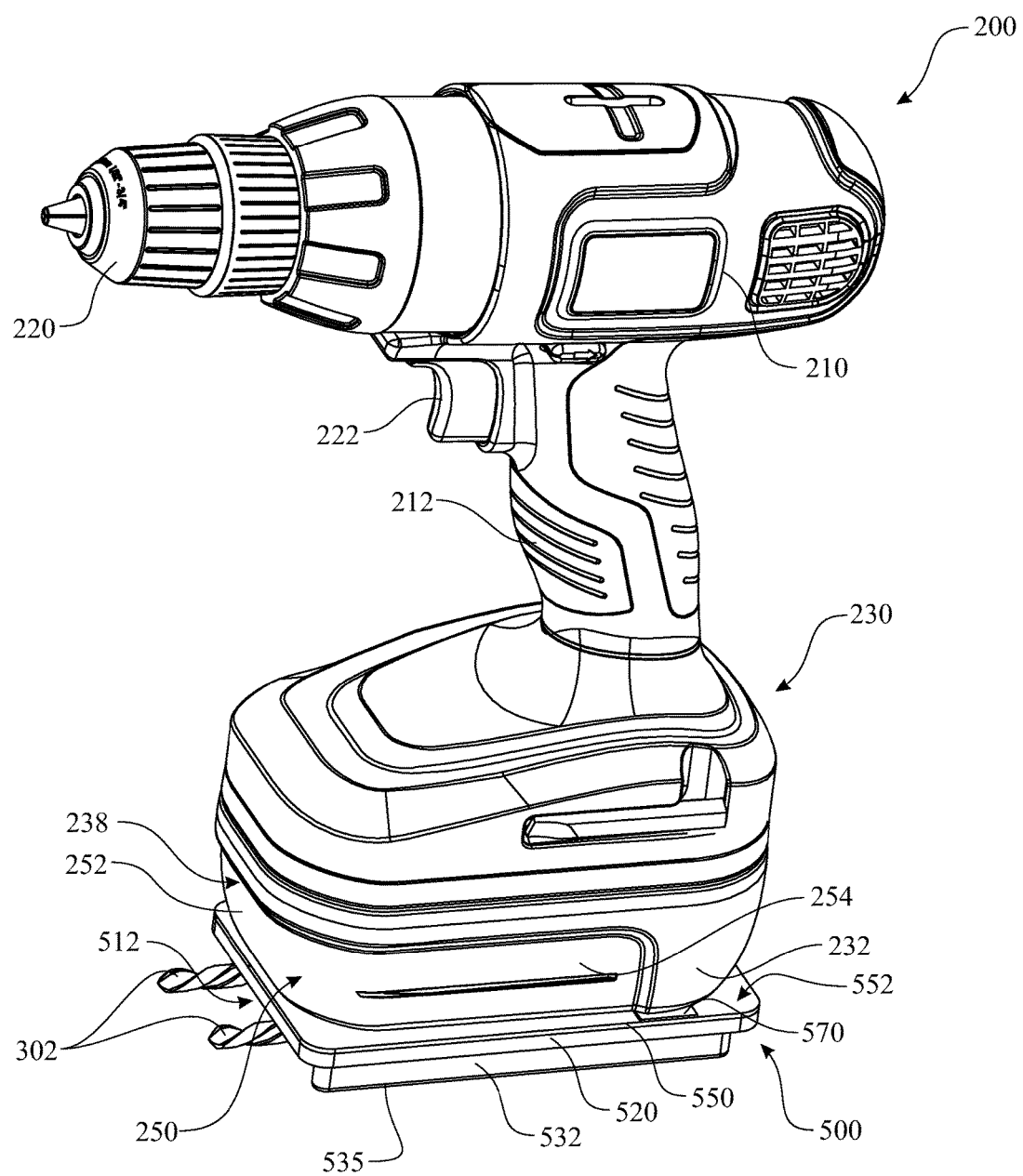
FIG. 10 presents an isometric view of an alternative magnetized item retention channel attached to a base of a portable power pack of a portable drill.
Figure 11:
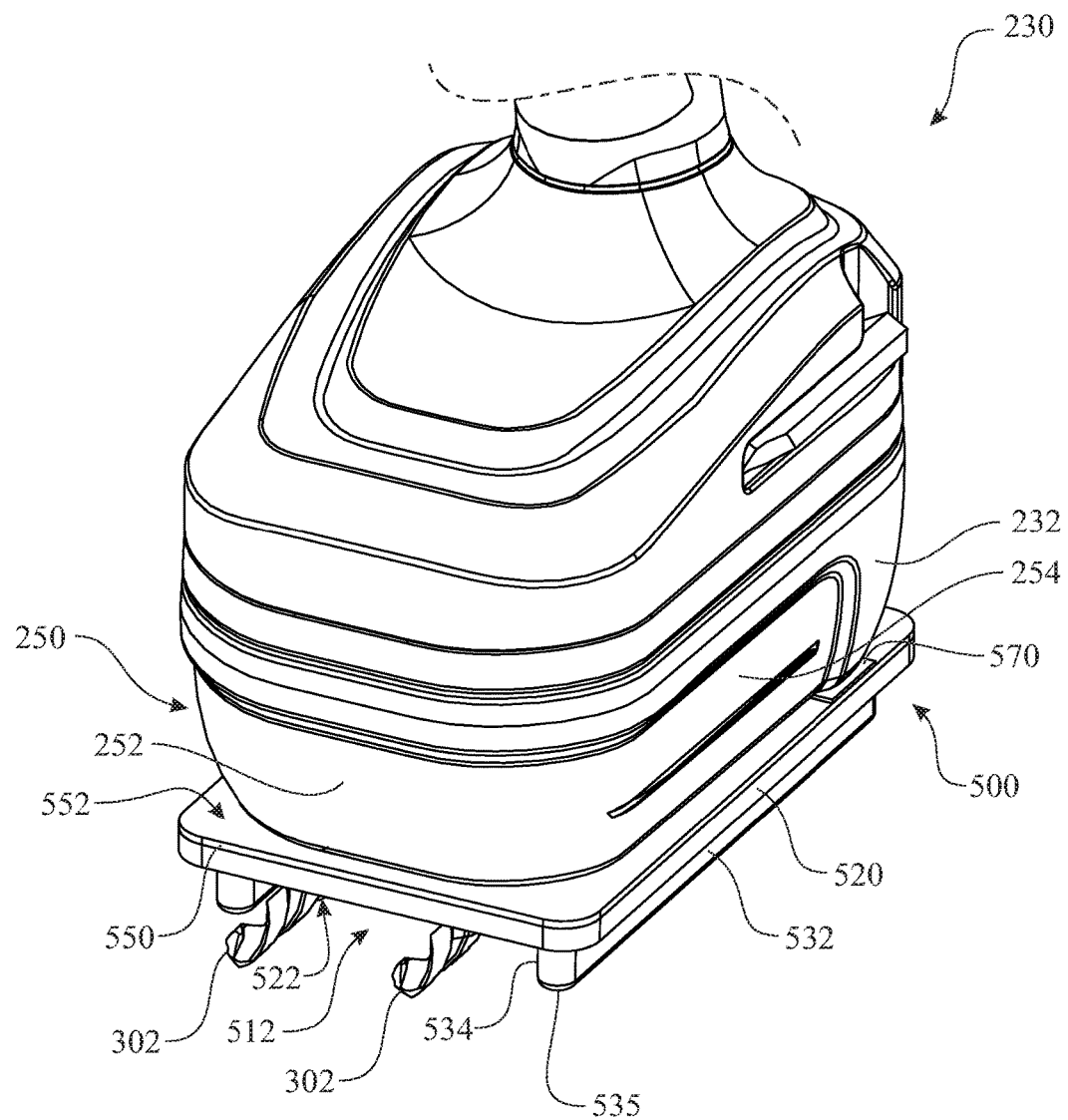
FIG. 11 presents an enlarged isometric view of the alternative magnetized item retention channel, originally introduced in FIG. 10, wherein the magnetized item retention channel is shown attached to the base the portable power pack of the portable drill.
Figure 12:
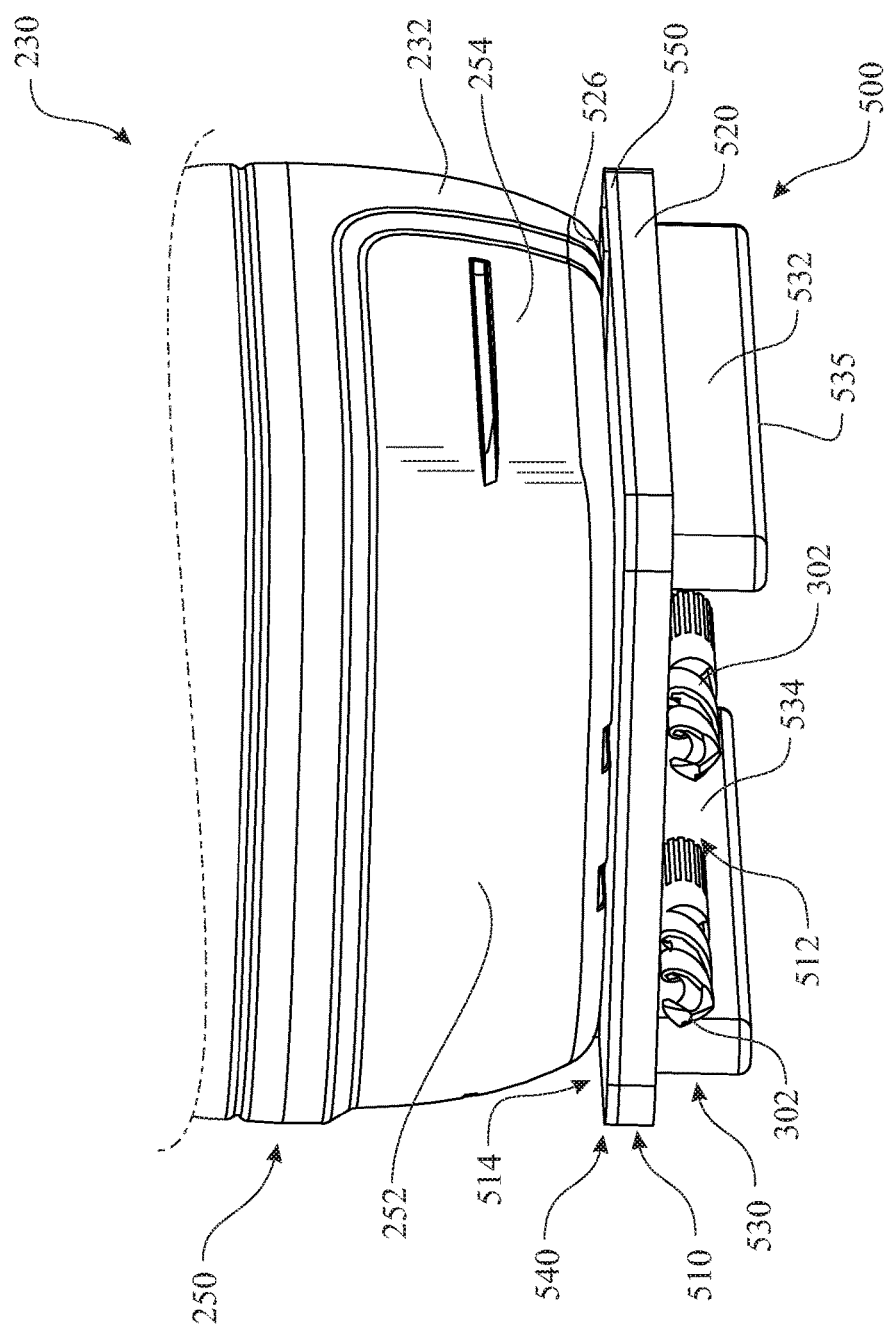
FIG. 12 presents an enlarged front isometric view of the alternative magnetized item retention channel, originally introduced in FIG. 10, wherein the magnetized item retention channel is shown attached to the base the portable power pack of the portable drill.

A magnetized item retention channel 400 is an alternative embodiment to the magnetized object retention panel 100, wherein the magnetized item retention channel 400 is detailed in FIGS. 8 and 9. The magnetized item retention channel 400 provides the general benefits of the magnetized object retention panel 100, while introducing other benefits. The magnetized item retention channel 400 is manufactured having a magnetized item retention channel body or a magnetized channel 410 segmented into a substantially planar channel base wall 420 and at least one channel sidewall 430 extending generally perpendicularly from a respective longitudinal edge 402, the at least one channel sidewall 430 terminating at a channel base surface 435. In a preferred embodiment, the magnetized item retention channel 400 includes a pair of channel sidewalls 430, each channel sidewall 430 extending generally perpendicular from a respective longitudinal edge 402, each of the pair of channel sidewalls 430 terminating at a respective channel base surface 435. Each channel sidewall 430 has a channel sidewall height 408 extending between the channel basewall exposed surface and the channel base surface. The channel sidewall height 408 is designed to accommodate a transverse dimension of an anticipated retained object 300. In a first variant, the channel sidewall height 408 is at least ½". In a second variant, the channel sidewall height 408 is between ¼" and ½". In a third variant, the channel sidewall height 408 is between ¼" and ¾". In a fourth variant, the channel sidewall height 408 is between ½" and 1". In a fifth variant, the channel sidewall height 408 is less than 1". In a sixth variant, the channel sidewall height 408 is between ½" and 1½". In a seventh, the channel sidewall height 408 is between ¾" and 1½". The height can be determined by the target application. A magnetized item retention channel 400 designed for a larger powered drill 200 would include the channel sidewalls 430 having a taller height compared to a magnetized item retention channel 400 designed for a lesser-powered drill 200. The theory is based upon the concept where the larger powered drill 200 is designed to utilize and install larger diameter objects 300 compared to the lesser-powered drill 200, therefore, the taller height would accommodate objects 300 having a larger diameter.

In a variant comprising a pair of channel sidewalls 430, it would be preferred where each channel sidewall 430 has the same channel sidewall height 408. In this configuration, the pair of channel base surface 435 defines a plane, wherein the channel base surface 435 can support the portable power drill 200 when the channel base surface 435 is placed against a level, planar surface.

The magnetized item retention channel 400 can be manufactured using any suitable manufacturing process, including injection molding, extruding, machining, and the like. The key operative components are integrated into the magnetized channel 410 and employed as follows: An adhesive 470 would be applied to an adhesive attachment surface 452 of the channel base wall 420. The adhesive would be applied in accordance with any of the embodiments previously described in the application of the magnetized object retention panel 100. The adhesive 470 is employed to affix the magnetized item retention channel 400 to the portable power drill 200, and more specifically a base or lower surface of the portable power drill 200. The base or lower surface can be the drill housing base surface 236 as illustrated or the battery pack bottom surface 256 in an alternative configuration. A magnetic material 460 is either applied to an exposed surface 462 of the magnetized channel 410 or integral with the material forming the magnetized channel 410. Like the magnetic material 111, the magnetic material 460 is used to retain magnetic objects 300 within an interior portion of the magnetized item retention channel 400. Magnetic objects 300 are retained within a cavity defined by interior surfaces of the channel base wall 420 and channel sidewall 430 by the magnetic material 460, as illustrated in FIGS. 8 and 9. In a condition where the magnetic objects 300 are exposed, an external object may accidentally contact the magnetic objects 300, dislodging the magnetic objects 300 from the magnetic material 460. The channel sidewall 430 aids in retaining the magnetic objects 300 within the interior of the channel by providing a barrier between any external object and the magnetic objects 300 retained within the cavity of the 400.

The pair of channel sidewalls 430 provides an additional advantage, wherein the pair of channel sidewalls 430 can be used to support the portable power drill 200 in an upright configuration. The channel sidewall 430 shadows the magnetic objects 300 within the interior of the channel. As previously mentioned, the channel sidewall height 408 is designed to accommodate a transverse dimension of an anticipated retained object 300. This feature is designed to result in the channel base surface 435 being the farthest surface from the magnetized exposed surface 462, thus enabling the channel base surface 435 to contact a supporting surface. The pair of channel base surfaces 435 defines a plane, wherein when placed on the supporting surface; the pair of channel base surfaces 435 stands the portable power drill 200 in an upright orientation.

Although the preferred embodiment orients each channel sidewall 430 being perpendicular to the channel base wall 420, it is understood that each channel sidewall 430 can be angled respective to the channel base wall 420. Each channel sidewall 430 can be angled outward creating a broader stance for supporting the portable power drill 200. Alternatively, the channel sidewall 430 can be centrally located extending downward from a central portion of the channel base wall 420. Any or all of the exposed surfaces of the channel sidewalls 430 can carry a magnetized material enabling retention of any objects which contain a magnetic material.

Grooves or channels, similar to the grooves 116 above, can be formed within the channel base wall 420, allowing some flexure for conforming to a non-planar surface.

The above disclosed embodiments describe a magnetized object retention panel 100 and a magnetized item retention channel 400 which carry a magnetized material on an exterior surface.

A variant of the magnetized object retention panel 100 and the magnetized item retention channel 400 is a magnetic item retention assembly 500, illustrated in FIGS. 10 through 17. The magnetic item retention assembly 500 has a majority of features that are similar to like features of the magnetized item retention channel 400. Like features of the magnetic item retention assembly 500 and the magnetized item retention channel 400 are numbered the same, except preceded by the numeral "5".

Figure 13:
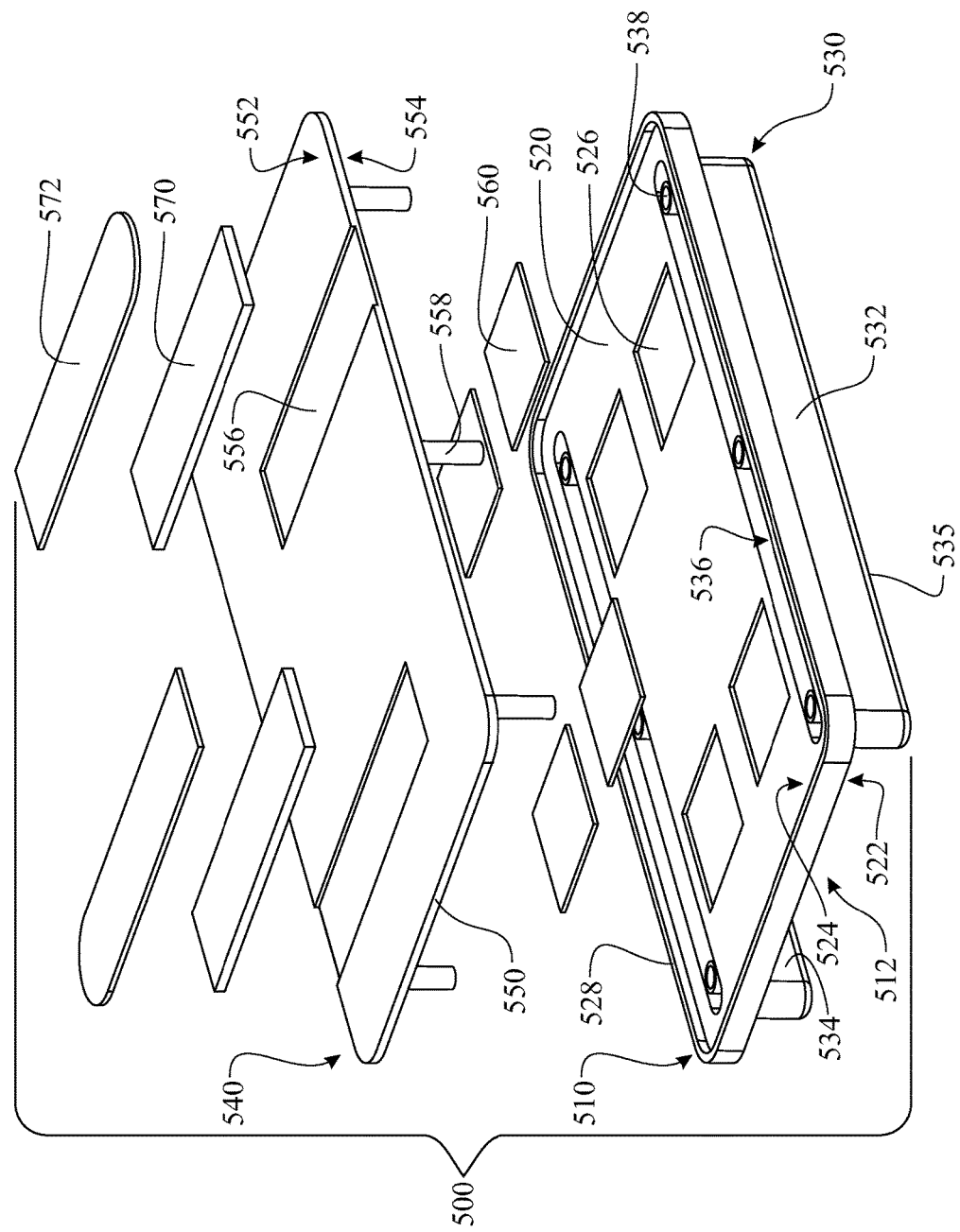
FIG. 13 presents an isometric view of the alternative magnetized item retention channel, originally introduced in FIG. 10.
Figure 14:
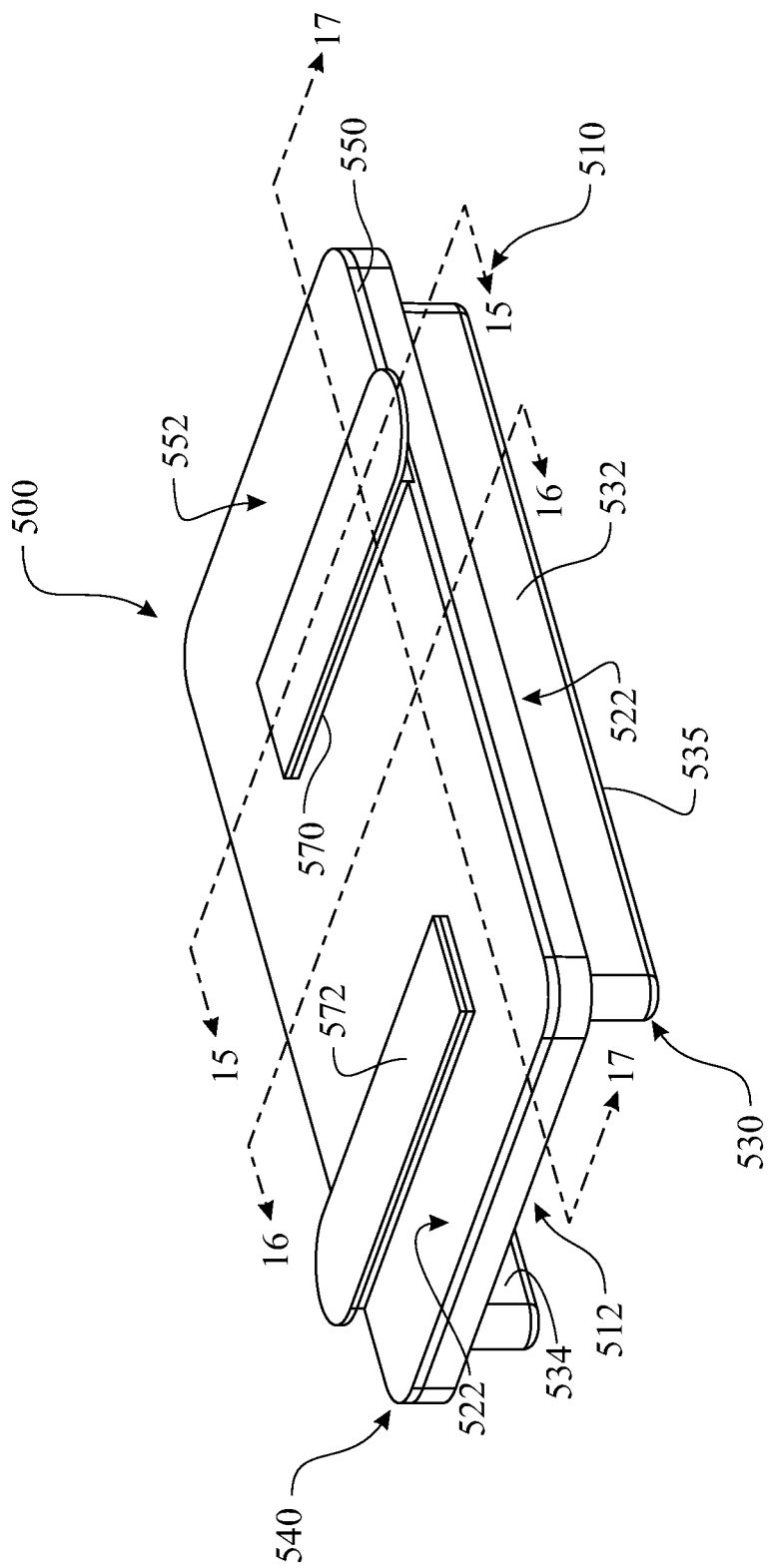
FIG. 14 presents an isometric exploded assembly view of the alternative magnetized item retention channel, originally introduced in FIG. 10.
Figure 15:
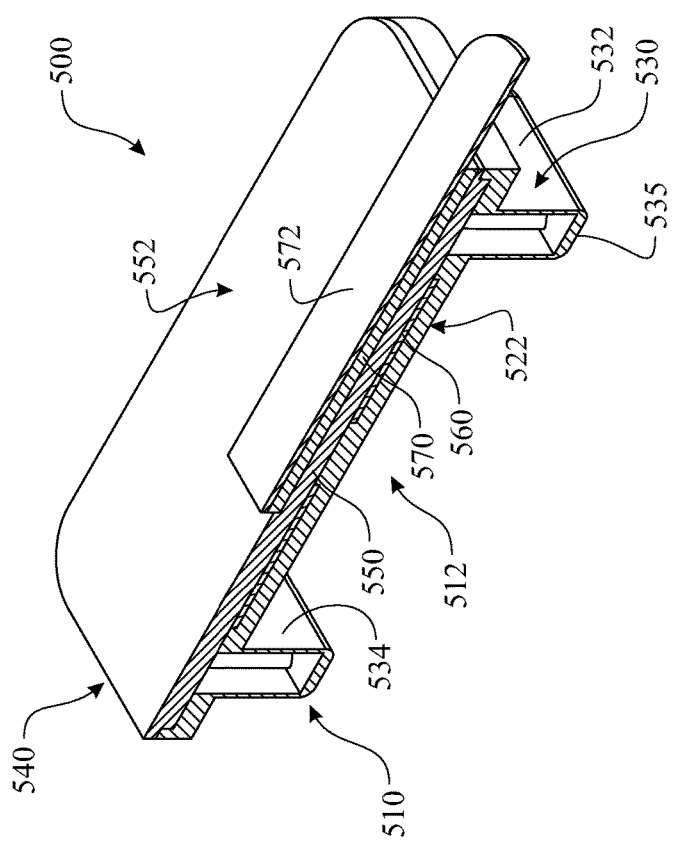
FIG. 15 presents an isometric section view of the alternative magnetized item retention channel, originally introduced in FIG. 10, wherein the section is taken along section line 15-15 of FIG. 14, which is a transverse direction at a location wherein a series of assembly pins are inserted into mating pin receptacles.

In the magnetized item retention channel 400, the magnetic material 460 is carried by an exterior surface of the magnetized channel 410. In the magnetic item retention assembly 500, a magnetized material is at least partially enclosed within a magnetized item retention channel body or a formed casing. The magnetized item retention channel body or casing includes a molded base section 510 and a molded top section 540, as best shown in FIG. 13. The casing 510, 540 can be manufactured of a non-magnetic material or a magnetic material. Alternatively the casing 510, 540 can be partially manufactured of a magnetic material wherein the balance would be manufactured of a non-magnetic material. The formed, non-magnetic casing 510, 540 can be designed having a planar shape, similar to the magnetized object retention panel 100 introduced in FIG. 1. The planar design can designed to be rigid or flexible. A flexible design would include design features and/or material selections to accommodate the flexibility. The planar design would omit each of the left and right extensions or feet of the exemplary embodiment.

The magnetic item retention assembly 500 is designed having a formation of an inverted "U" shape, comprising a generally planar base panel or planar base panel 520 and at least one base member leg segment 530 extending generally perpendicular from a respective longitudinal edge of the planar base panel 520, wherein the at least one base member leg segment 530 extends substantially perpendicularly from a planar base panel exterior surface 522 of the planar base panel 520.

In the exemplary embodiment, four magnetized element receiving cavities 526 are formed in the planar base panel 520. Although the exemplary embodiment includes four magnetized element receiving cavities 526, it is understood that one or any number of magnetized element receiving cavities 526 can be incorporated into the design. The magnetized element receiving cavities 526 would be configured in any suitable arrangement. A single magnetized element receiving cavity 526 would preferably be centered in the planar base panel 520. A multi-cavity design would preferably arrange the magnetized element receiving cavities 526 in a geometrically balancing arrangement, such as a spatial array layout.

The magnetized elements 560 can be fabricated using any suitable material, wherein the material would be determined based upon properties of the material, including a magnetic strength, weight, retention of the magnetic properties, cost, availability, and the like.

The exemplary formed magnetized item retention assembly 500 is fabricated having a molded base section 510 and a molded top section 540. The molded base section 510 includes the primary features of the assembly 500, including the planar base panel 520 and the pair of base member leg segments 530. The planar base panel 520 and pair of base member leg segments 530 collectively form an inverted "U" shape. Orientation of the planar base panel 520 can be referenced as having a planar base panel exterior surface 522 and a planar base panel interior surface 524. The magnetized element receiving cavities 526 are preferably formed in the planar base panel interior surface 524 of the planar base panel 520. Features of each base member leg segment 530 of the pair of base member leg segments 530 includes a base member leg segment outer panel 532 located on an outward side of the molded base section 510, a base member leg segment inner panel 534 located on an inward side of the molded base section 510, and a leg segment interior cavity 536 defined between facing surface of the base member leg segment outer panel 532 and the base member leg segment inner panel 534. The base member leg segment outer panel 532 can be designed to be continuous with the peripheral edge of the planar base panel 520 (as in the magnetized item retention channel 400) or slightly inboard thereof (as shown). A base member channel bottom support section 535 extends between distal edges of the base member leg segment outer panel 532 and the base member leg segment inner panel 534 forming a bottom. A height of the base member leg segment 530 would be similar to the height of the channel sidewall 430 as previously described to define a depth of the channel accordingly.

A magnetic item retention and storage channel 512 is defined by the planar base panel exterior surface 522 and the pair of base member leg segment inner panels 534. The magnetic item retention and storage channel 512 is designed to partially encase magnetic objects 300, such as tools, drill bits 302, screwdriver bits 304, hex driver bits 306, Allen wrenches 308, screws 312, bolts 314, hex nuts 316, acorn nuts 318, flat washers 319, and any other magnetically attracting objects.

The molded base section 510 and molded top section 540 are joined together using any suitable joining configuration, material, and associated process. In the exemplary embodiment, the molded base section 510 includes a series of cover panel assembly pin receptacles 538 and the molded top section 540 includes a series of cover panel assembly pins 558. Each cover panel assembly pin receptacle 538 of the series of cover panel assembly pin receptacles 538 can be located within the leg segment interior cavity 536 of the respective base member leg segment 530 as shown in the exploded assembly view illustrated in FIG. 13 and the section views illustrated in FIGS. 15 and 16. The exemplary embodiment include a central cover panel assembly pin receptacle 538 located spatially between each of a pair of end our outer cover panel assembly pin receptacles 538. The magnetized element 560 or magnetized elements 560 would be inserted into the cavity 526 or cavities 526 prior to joining the base section 510 and top section 540 together. A magnetic object or a magnetized object can be employed to retain the magnetized elements 560 in position during the assembly process. The polarity of the magnetized elements 560 can be considered when orienting and placing the magnetized elements 560 into the cavities 526.

Figure 16:
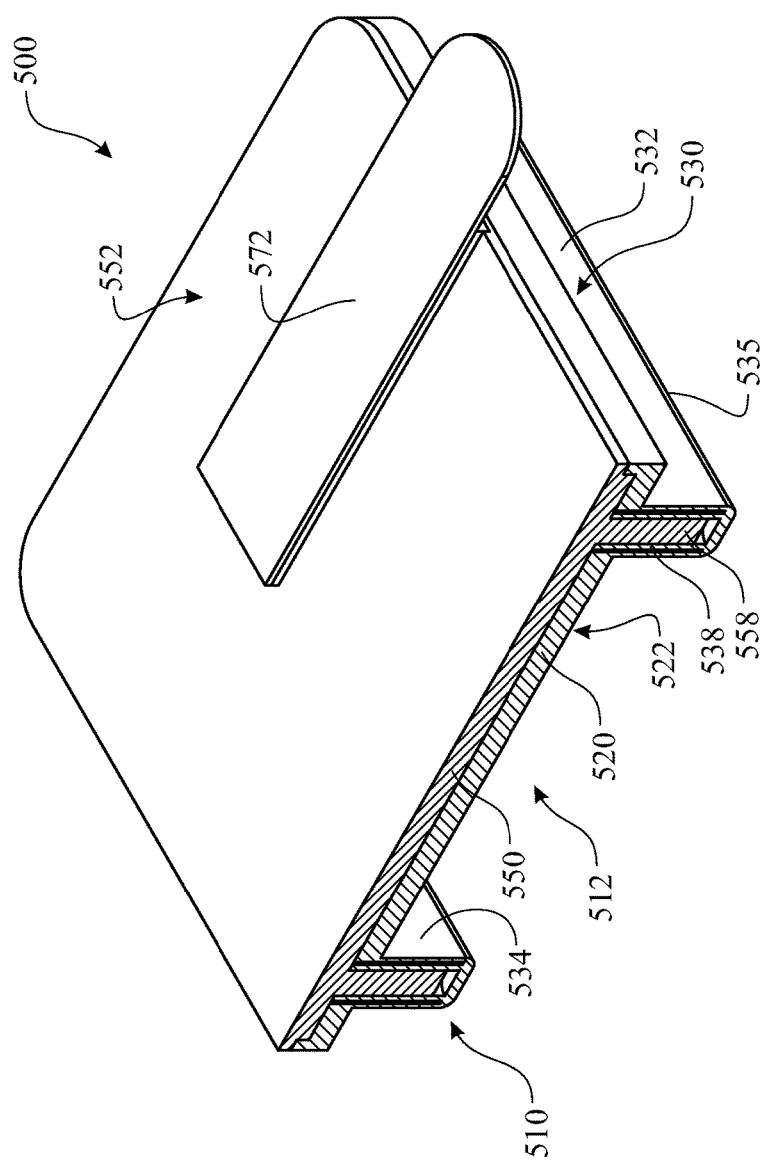
FIG. 16 presents an isometric section view of the alternative magnetized item retention channel, originally introduced in FIG. 10, wherein the section is taken along section line 16-16 of FIG. 14, which is a transverse direction at a location of pins and mating pin receptacles.
Figure 17:
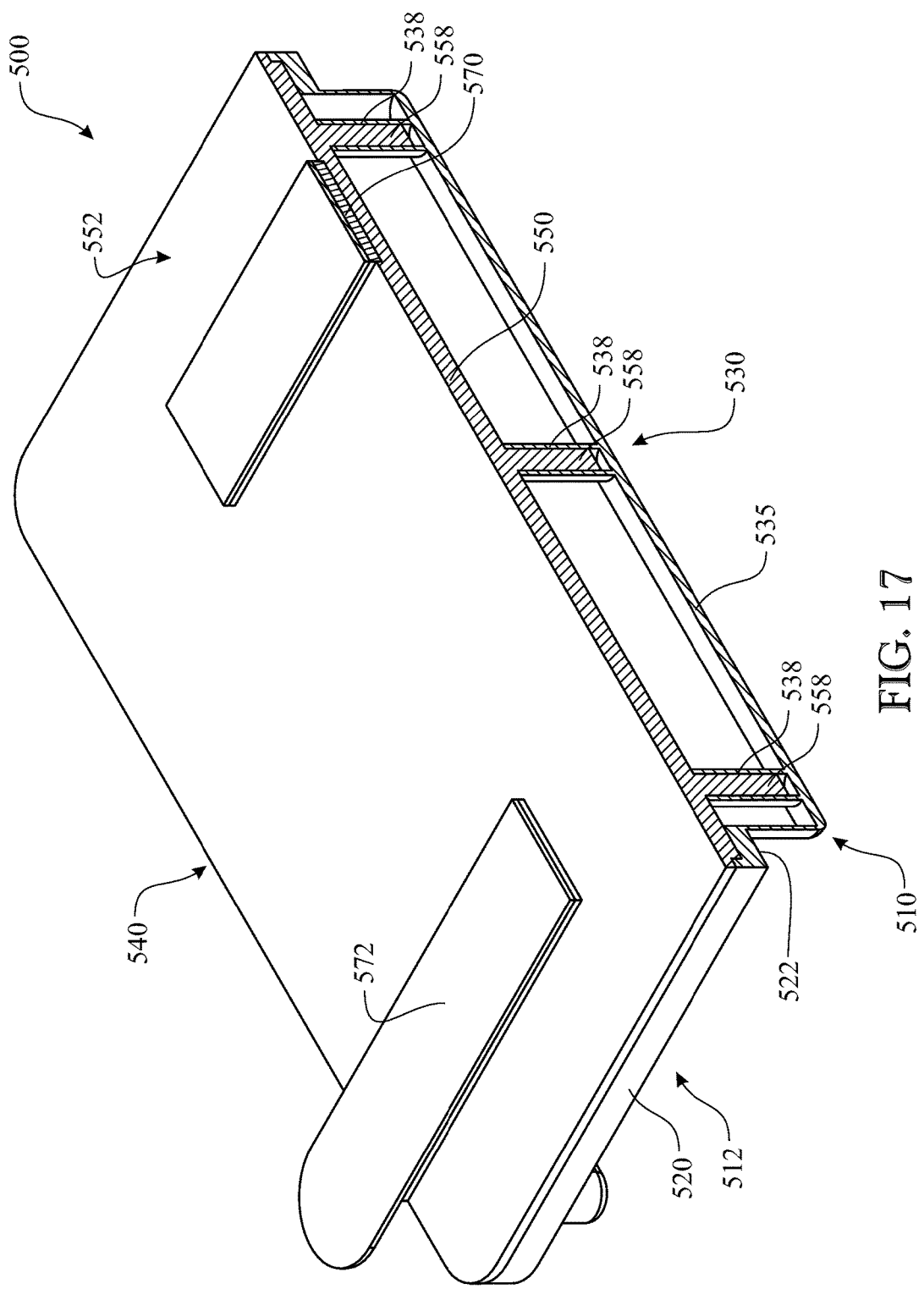
FIG. 17 presents an isometric section view of the alternative magnetized item retention channel, originally introduced in FIG. 10, wherein the section is taken along section line 17-17 of FIG. 14, which is a longitudinal direction at a location wherein a series of assembly pins are inserted into mating pin receptacles.

The molded base section 510 and the molded top section 540 are joined together by inserting each cover panel assembly pin 558 into the mating cover panel assembly pin receptacle 538 as shown in the section view illustrated in FIG. 16. Each cover panel assembly pin 558 can be secured within the associated mating cover panel assembly pin receptacle 538 using any suitable joining process, including a press fit design, a mechanical latching design, a bonding agent, a welding process, and the like. The top section cover panel interior surface 554 of the top section cover panel 550 is seated against a base member cover supporting edge 528 of the planar base panel 520. The base member cover supporting edge 528 can be located atop a short peripheral wall circumscribing a periphery of the planar base panel 520.

Although the exemplary embodiment describes a series of cover panel assembly pins 558 and mating cover panel assembly pin receptacles 538 for assembly of the base section 510 and the top section 540 to one another, it is understood that any suitable joining method can be used. Alternative joining methods can include any suitable mating mechanical features, including:

clips,
mechanical fasteners,
mechanical snaps,
threaded fasteners,
a channel and respective mating edge,
and the like.

Examples of mechanical interfaces that can be employed to join the base section 510 and the top section 540 together include:

a press fit interface,
a snap-together interface,
an interference fit interface,
a mechanical latching interface,
and the like.

Examples of bonding agents that can be employed to join the base section 510 and the top section 540 together include:

an adhesive,
a one part epoxy,
a multi-part epoxy,
ultrasonic welding,
an adhesive tape,
and the like.

Although the exemplary embodiment locates the magnetized elements 560 spatially arranged about the planar base panel 520, it is understood that the magnetized elements 560 can be inserted into the leg segment interior cavity 536 of the base member leg segment 530. The magnetized elements 560 can be located within the planar base panel 520, within the base member leg segment 530, or within both of the planar base panel 520 and the base member leg segment 530.

A bonding material can be applied or adhered to an upper surface of the top section 540 for preparation of attachment of the assembly to a drill 200 or portable power pack 250 for use with the drill 200. Although the target application would be a drill 200, it is understood that the magnetized item retention assembly 500 can be adapted for use with any power tool, work supporting device (such as a bench, a ladder, and the like). It is also understood that the magnetized properties of the magnetized elements 560 can be used to use a magnetic item to temporarily support the magnetized item retention assembly, such as a steel ladder, a metallic component of a vehicle, a metallic cart, and the like.

In the exemplary embodiment, the magnetic item retention assembly 500 employs a pair of adhesives 570 which are adhesively attached to a top section cover panel exterior surface 552 of the top section cover panel 550. An adhesive receiving cavity 556 can be formed within the top section cover panel exterior surface 552 of the top section cover panel 550. The adhesive 570 would be seated within the respective adhesive receiving cavity 556. A removable adhesive cover 572 would be temporarily adhesively attached to an exposed side of the adhesive 570 to maintain adhesive properties of the exposed side of the adhesive 570 until use. The exemplary embodiment includes a pair of adhesive 570. Each adhesive 570 of the pair of adhesive 570 would be seated within a respective adhesive receiving cavity 556. Prior to attachment, the user would remove each removable adhesive cover 572 from each respective adhesive 570, exposing the adhesive on an outer surface of the adhesive 570. The adhesive on an outer surface of the adhesive 570 is used to bond the magnetic item retention assembly 500 to the desired surface, such as a base of the portable power drill 200, a base of the battery pack 250 and the like.

It is understood that the adhesive 570 is only one option for securing the magnetic item retention assembly 500 to an object and that other options can be employed. In one alternative solution, the adhesive 570 can be fabricated of a magnetized material, enabling attachment of the magnetic item retention assembly 500 to a mating magnetic element on or in a receiving object. The mating magnetic element can be an existing element integral with the receiving object or coupled to the receiving object. In one solution, the mating magnetic element can be adhesively bonded to the receiving object. The mating magnetic element and the magnetized elements 560 of the magnetic item retention assembly 500 can be magnetically attracted to one another to temporarily secure the magnetic item retention assembly 500 to the receiving object. In a second alternative solution, the adhesive 570 can be mating segments of a dense hook and loop tape, enabling removable attachment of the magnetic item retention assembly 500 to/from an object. One section of the dense hook and loop tape would be adhered to the top section cover panel exterior surface 552 and a second, mating section of the dense hook and loop tape would b adhered to the object. The first section and the second, mating section of the dense hook and loop tape would be located in registration with one another. The duty level of the dense hook and loop tape would be based upon the desired attraction level between the hook section and loop section. In yet another example, the adhesive 570 would be replaced with a tie or similar material, enabling the user to tie the magnetic item retention assembly 500 to the object.

The magnetized item retention assembly 500 includes at least one cavity 526 for receiving and retaining a magnetized element 560. The magnetized element receiving cavity 526 can be located at any portion of the magnetized item retention assembly 510, 540. As described above, the exemplary embodiment of the magnetic item retention assembly 500 locates the magnetized element receiving cavity 526 in the base section 510. It is also understood that the magnetized element receiving cavities 526 can be integrated into the at least one base member leg segment 530. In the exemplary embodiment, magnetized elements can be inserted into the cavities 536 formed between adjacent pairs of pin receptacles 538. This configuration enables retention of magnetic objects by each of the at least one base member leg segment 530.

Although the exemplary embodiment is design having two body sections: a base section 510 and a top section 540, it is understood that any number of sections can be incorporated into the design. In yet another alternative embodiment, the magnetized elements 560 can be incorporated into a molding or other forming process that fabricates the body of the magnetic item retention assembly 500 in a single process.

In the disclosed embodiment, the magnets 560 are completely encapsulated within the body 510, 540 of the magnetized item retention assembly 500. It is understood that the magnetized elements 560 can be partially encapsulated within the body of the magnetized item retention assembly 500.

Figure 18:
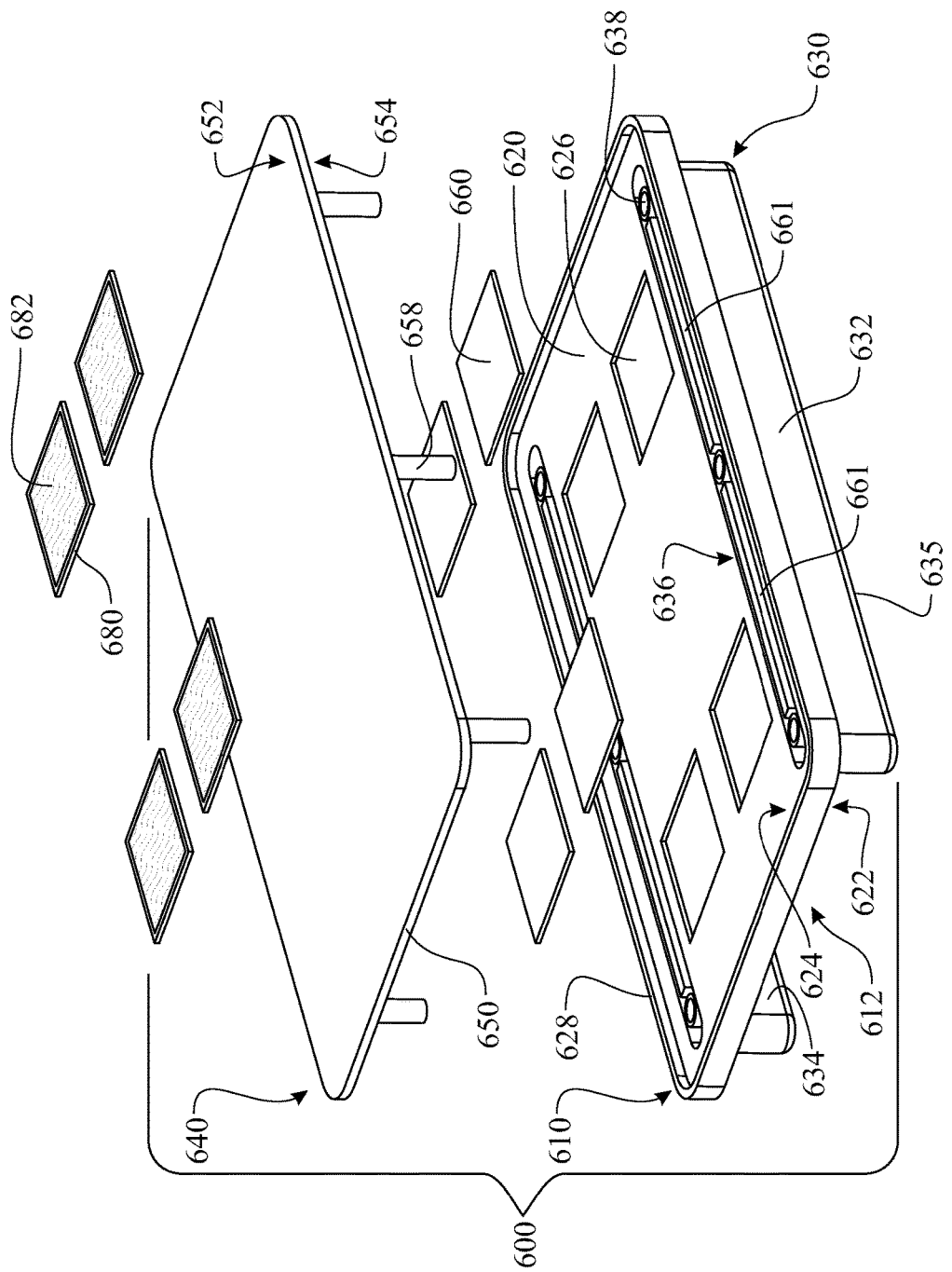
FIG. 18 presents an isometric exploded assembly view of a variant of the alternative magnetized item retention channel, originally introduced in FIG. 10, wherein the variant introduces an alternative attachment system.

The magnetized item retention assembly 500 can be modified for attachment to a receiving object using a magnetically attracting interface. The variant is referred to as a magnetized item retention assembly 600, introduced in an exploded assembly view of FIG. 18. The magnetic item retention assembly 600 has a majority of features that are similar to like features of the magnetized item retention channel 400, 500. Like features of the magnetic item retention assembly 600 and the magnetized item retention channel 400, 500 are numbered the same, except preceded by the numeral "6".

The differentiating feature between the magnetized item retention assembly 600 and the magnetized item retention assembly 500 is the mechanism for attaching the magnetized item retention assembly 600 to the receiving object, such as the housing of the drill 200 or portable tool or the casing of the battery pack 250. The magnetized item retention assembly 500 employs a strip of adhesive 570. Conversely, the magnetized item retention assembly 600 exploits magnetically attracting properties of the magnetized elements 660. One or more mating magnetic elements 680 are carried by the receiving object. The one or more mating magnetic elements 680 are located upon the receiving object in registration with magnetized elements 660 of the magnetized item retention assembly 600. The one or more mating magnetic elements 680 would be oriented providing a magnetic attraction with the magnetic elements 670 of the magnetized item retention assembly 600. The one or more mating magnetic elements 680 can be carried by the receiving object using any suitable attachment design or integration configuration. One suggested solution is a mating magnetic element bonding adhesive 682, which could be pre-applied to an attachment or bonding surface of each mating magnetic element 680. In use, the one or more mating magnetic elements 680 are adhesively bonded to the receiving object (such as the housing of the drill 200 or portable tool or the casing of the battery pack 250) using the mating magnetic element bonding adhesive 682. The one or more mating magnetic elements 680 would be located in registration with magnetized elements 660 of the magnetized item retention assembly 600. The user would temporarily magnetically couple each of the one or more mating magnetic elements 680 with the magnetic elements 670 prior to attachment to aid in locating each of the one or more mating magnetic elements 680. The user would then magnetically secure the magnetized item retention assembly 600 to the receiving object using the magnetic attraction between the one or more mating magnetic elements 680 and the magnetic elements 670. The user would complete any desired tasks exploiting the advantages of the magnetic retention within the magnetic item retention and storage channel 612 of the magnetic item retention assembly 600. Upon completion of the desired tasks, the user would separate from the magnetic item retention assembly 600 from the receiving object and store both devices accordingly. This assembly configuration or any similar temporary assembly configuration can be included to accommodate storage in cases, etc. The assembly configuration additionally allows the user to remove the magnetic item retention assembly 600 to access in tight places.

The magnetic item retention assembly 600 additionally introduces a series of channel seated magnetized elements 661 inserted into each leg segment interior cavity 636. The inclusion of the series of channel seated magnetized elements 661 increases a magnetized surface area for retention of magnetic objects 300. It is understood that the magnetic item retention assembly 600 can include at least one base panel seated magnetized element 660, at least one channel seated magnetized element 661, or both. The number, shape, size, strength, and the like of the magnetized elements 660, 661 would be determined by the product designer.

The attachment surface of each of the mating magnetic elements 680 can be coated with a protective coating to reduce any effect of an impact on the magnets. Additionally, the combination of two magnets, more specifically the magnetic elements 660 and the mating magnetic elements 680 significantly increases the magnetic attraction for retaining magnetic objects 300.

Although the above described embodiments present an accessory 100, 400, 500, 600 that is subsequently affixed to a drill 200 or other portable tool, it is understood that the magnetized retention system 100, 400, 500, 600 can be integrated into the housing of the drill 200 or portable tool or the casing of the battery pack 250.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REF NO. DESCRIPTION 100 magnetized object retention panel
110 magnetized substrate
111 magnetic material
112 magnetized exposed surface
114 adhesive attachment surface
116 grooves
120 longitudinal edge
122 lateral edge
126 adhesive
128 backing member
130 front attaching segment
132 side attaching segment
134 arched segment
200 portable power drill
210 drill housing
212 drill handgrip
220 chuck
222 trigger
230 battery receiving section
232 battery receptacle
236 drill housing base surface
238 battery receiving cavity
250 battery pack
252 battery pack front surface
254 battery pack side surface
256 battery pack bottom surface
300 magnetic objects
302 drill bit
304 screwdriver bit
306 hex driver bit
308 Allen wrench
312 screw
314 bolt
316 hex nut
318 acorn nut
319 flat washer
400 magnetized item retention channel
410 magnetized item retention channel body (magnetized channel)
460 magnetic material
462 magnetized exposed surface
452 adhesive attachment surface
420 channel base wall
430 channel sidewall
435 channel base surface
402 longitudinal edge
408 channel sidewall height
470 adhesive
500 magnetic item retention assembly
510 molded base section
512 magnetic item retention and storage channel
520 planar base panel
522 planar base panel exterior surface
524 planar base panel interior surface
526 magnetized element receiving cavity
528 base member cover supporting edge
530 base member leg segment
532 base member leg segment outer panel
534 base member leg segment inner panel
535 base member channel bottom support section
536 leg segment interior cavity
538 cover panel assembly pin receptacle
540 molded top section
550 top section cover panel
552 top section cover panel exterior surface
554 top section cover panel interior surface
556 adhesive receiving cavity
558 cover panel assembly pin
560 magnetized elements
570 adhesive
572 removable adhesive cover
600 magnetic item retention assembly
610 molded base section
612 magnetic item retention and storage channel
620 planar base panel 622 planar base panel exterior surface
624 planar base panel interior surface
626 magnetized element receiving cavity
628 base member cover supporting edge
630 base member leg segment
632 base member leg segment outer panel
634 base member leg segment inner panel
635 base member channel bottom support section
636 leg segment interior cavity
638 cover panel assembly pin receptacle
640 molded top section
650 top section cover panel
652 top section cover panel exterior surface
654 top section cover panel interior surface
656 adhesive receiving cavity
658 cover panel assembly pin
660 magnetized elements
661 channel seated magnetized elements
670 adhesive
672 removable adhesive cover
680 mating magnetic element
682 mating magnetic element bonding adhesive

What is claimed is:

1. A magnetized item retention assembly adapted for use with a portable power tool, the magnetized item retention assembly comprising:
    magnetized item retention channel body comprising:
        a planar base panel having an exposed surface and an opposite, attachment surface, the exposed surface and the opposite, attachment surface being bound by a peripheral edge, the planar base comprising an interior defined by a pair of opposing interior surfaces, and at least one cavity formed within one of the interior surfaces, and
        at least one base member leg segment extending generally perpendicularly from the exposed surface of the planar base panel, the at least one base member leg segment terminating at a channel base surface, the at least one base member leg segment having a shape following a contour of the peripheral edge, the at least one base member leg segment terminating at a first base member leg segment end and a second base member leg segment end, wherein the exposed surface includes a gap between the first base member leg segment end and the second base member leg segment end; and
    at least one a magnetized element assembled to the magnetized item retention channel body having each at least one magnetized element being located within the respective at least one cavity,
        wherein the design of the magnetized item retention channel body enables a magnetically attracted retained object to be retained by the at least one a magnetized element and extend through the gap and beyond the peripheral edge of the planar base panel.

2. The magnetized item retention assembly as recited in claim 1, further comprising a coupling element carried by the planar base panel attachment surface.

3. The magnetized item retention assembly as recited in claim 2, wherein the coupling element includes at least one of:
    an adhesive material,
    a magnetized material, and
    a dense hook and loop tape.

4. The magnetized item retention assembly as recited in claim 1, the planar base panel further comprising a planar section base panel and a planar section cover panel, the planar section base panel having one side defining the exposed surface and a second side defining one interior surface of the pair of opposing interior surfaces and the planar section cover panel having one side defining the opposite, attachment surface and a second side defining a second interior surface of the pair of opposing interior surfaces.

5. The magnetized item retention assembly as recited in claim 1, each of the at least one base member leg segment further comprising an inner sidewall, an outer sidewall, and a base member channel bottom support section forming a leg segment interior cavity, wherein at least one magnetized element is located within the leg segment interior cavity.

6. The magnetized item retention assembly as recited in claim 1, the planar base panel further comprising a planar section base panel and a planar section cover panel;
    each of the at least one base member leg segment further comprising an inner sidewall, an outer sidewall, and a base member channel bottom support section forming a leg segment interior cavity;
    wherein the at least one a magnetized element is located in accordance with at least one of:
    between the planar section base panel and the planar section cover panel, and
    within the leg segment interior cavity.

7. The magnetized item retention assembly as recited in claim 6, the planar section base panel and the planar section cover panel are assembled to one another using at least one assembly feature located within the leg segment interior cavity.

8. A magnetized item retention assembly adapted for use with a portable power tool, the magnetized item retention assembly comprising:
    a magnetized item retention channel body comprising a base section and a top section,
    the base section comprising:
        a planar base panel having an exposed surface and an opposite, attachment surface, the exposed surface and the opposite, attachment surface being bound by a peripheral edge,
        at least one base member leg segment extending generally perpendicularly from the exposed surface of the planar base panel, the at least one base member leg segment terminating at a channel base surface, the at least one base member leg segment having a generally shape following a contour of the peripheral edge, the at least one base member leg segment terminating at a first base member leg segment end and a second base member leg segment end, wherein the exposed surface includes a gap between the first base member leg segment end and the second base member leg segment end, and
        each of the at least one base member leg segment further comprising an inner sidewall, an outer sidewall, and a base member channel bottom support section forming a leg segment interior cavity; and
    the top section comprising:
        a top section cover panel having an exposed top section cover panel exterior surface and an opposite top section cover panel interior surface; and
    at least one a magnetized element is located in accordance with at least one of:
    (a) between the between the planar base panel and the top section cover panel, and
    (b) within the leg segment interior cavity,
    wherein the design of the magnetized item retention channel body enables a magnetically attracted retained object to be retained by the at least one a magnetized element and extend through the gap and beyond the peripheral edge of the planar base panel.

9. The magnetized item retention assembly as recited in claim 8, further comprising a coupling element carried by the exposed top section cover panel exterior surface.

10. The magnetized item retention assembly as recited in claim 9, wherein the coupling element includes at least one of:
   an adhesive material,
   a magnetized material, and
   a dense hook and loop tape.

11. The magnetized item retention assembly as recited in claim 8, further comprising a coupling system, the coupling system including at least one mating magnetic element,
   wherein the at least one mating magnetic element is magnetically attracted to the at least one a magnetized element,
   wherein the at least one mating magnetic element is carried by a receiving object.

12. The magnetized item retention assembly as recited in claim 8, wherein the at least one a magnetized element is assembled between the planar base panel and the top section cover panel.

13. The magnetized item retention assembly as recited in claim 8, wherein at least one magnetized element is located within the leg segment interior cavity.

14. The magnetized item retention assembly as recited in claim 8, wherein the base section and the cover section are assembled to one another using at least one assembly feature located within the leg segment interior cavity.

15. A magnetized item retention assembly used in conjunction with a portable power tool, the magnetized item retention assembly comprising:
   a magnetized item retention channel body comprising a base section and a top section,
   the base section comprising:
      a planar base panel having an exposed surface and an opposite, attachment surface, the exposed surface and the opposite, attachment surface being bound by a peripheral edge, and
      at least one base member leg segment extending generally perpendicular from the exposed surface of the planar base panel, the at least one base member leg segment terminating at a channel base surface, the at least one base member leg segment having a generally shape following a contour of the peripheral edge, the at least one base member leg segment terminating at a first base member leg segment end and a second base member leg segment end, wherein the exposed surface has a gap between the first base member leg segment end and the second base member leg segment end; and
   the top section comprising:
      a top section cover panel having an exposed top section cover panel exterior surface and an opposite top section cover panel interior surface, the opposite top section cover panel interior surface and the planar base panel opposite, attachment surface being assembled to one another; and
      at least one a magnetized element assembled between the base section and the top section,
   wherein the design of the magnetized item retention channel body enables a magnetically attracted retained object to be retained by the at least one a magnetized element and extend through the gap and beyond the peripheral edge of the planar base panel,
   wherein the planar base panel attachment surface is attached to a power tool.

16. The magnetized item retention assembly as recited in claim 15, wherein the planar base panel attachment surface is attached to the power tool by at least one of:
   an adhesive material,
   a magnetized material,
   the at least one mating magnetic element, which is magnetically attracted to an at least one magnetized element, wherein the at least one mating magnetic element is carried by the power tool, and
   a dense hook and loop tape, wherein one section of the dense hook and loop tape is carried by the planar base panel attachment surface and a mating section of the dense hook and loop tape is carried by the power tool.

17. The magnetized item retention assembly as recited in claim 15, wherein the at least one a magnetized element is assembled between the planar base panel and the top section cover panel.

18. The magnetized item retention assembly as recited in claim 15, each of the at least one base member leg segment further comprising an inner sidewall, an outer sidewall, and a base member channel bottom support section forming a leg segment interior cavity, wherein at least one magnetized element is located within the leg segment interior cavity.

19. The magnetized item retention assembly as recited in claim 15,
   each of the at least one base member leg segment further comprising an inner sidewall, an outer sidewall, and a base member channel bottom support section forming a leg segment interior cavity;
   wherein the at least one a magnetized element is located in accordance with at least one of:
   between the between the planar base panel and the top section cover panel, and
   within the leg segment interior cavity.

20. The magnetized item retention assembly as recited in claim 15, the planar base panel further comprising a planar section base panel and a planar section cover panel, the planar section base panel having one side defining the exposed surface and a second side defining one interior surface and the planar section cover panel having one side defining the opposite, attachment surface and a second side defining a second interior surface,
   the planar base comprising an interior defined by the planar section cover panel interior surface and the opposite facing planar section base panel interior surface,
   the planar base panel further comprising at least one cavity formed within one of the first interior surface and the second interior surface.

* * * * *